(12) United States Patent
Fan et al.

(10) Patent No.: US 11,261,288 B2
(45) Date of Patent: Mar. 1, 2022

(54) ALLYL FUNCTIONAL URETHANE OLIGOMERS AND RELATED COMPOSITIONS FOR COATINGS AND ADHESIVES

(71) Applicant: Arkema France, Colombes (FR)

(72) Inventors: Mingxin Fan, Guangdong (CN); Aibin Shi, Guangdong (CN); Zhenjie Wei, Guangdong (CN)

(73) Assignee: Arkema France, Colombes (FR)

( * ) Notice: Subject to any disclaimer, the term of this patent is extended or adjusted under 35 U.S.C. 154(b) by 61 days.

(21) Appl. No.: 16/640,879

(22) PCT Filed: Aug. 22, 2017

(86) PCT No.: PCT/CN2017/098399
§ 371 (c)(1),
(2) Date: Feb. 21, 2020

(87) PCT Pub. No.: WO2019/036887
PCT Pub. Date: Feb. 28, 2019

(65) Prior Publication Data
US 2020/0392280 A1  Dec. 17, 2020

(51) Int. Cl.
| | |
|---|---|
| C08F 2/46 | (2006.01) |
| C08F 2/50 | (2006.01) |
| C08G 61/04 | (2006.01) |
| C08G 18/67 | (2006.01) |
| C08G 18/24 | (2006.01) |
| C08G 18/32 | (2006.01) |
| C08G 18/73 | (2006.01) |
| C08G 18/75 | (2006.01) |
| C09D 175/14 | (2006.01) |
| C09J 175/14 | (2006.01) |
| C09K 3/10 | (2006.01) |

(52) U.S. Cl.
CPC ....... *C08G 18/6755* (2013.01); *C08G 18/246* (2013.01); *C08G 18/3215* (2013.01); *C08G 18/73* (2013.01); *C08G 18/755* (2013.01); *C09D 175/14* (2013.01); *C09J 175/14* (2013.01); *C09K 3/1021* (2013.01); *C09K 2200/065* (2013.01)

(58) Field of Classification Search
CPC ............ C08G 18/6755; C08G 18/6715; C08G 18/73; C08G 18/8166; C08G 18/755; C08G 18/673; C08G 18/244; C08G 18/3215; C08G 18/4825; C08G 18/246; C08G 18/8175; C08G 18/48; C08G 18/672; C08G 18/42; C09D 151/08; C09D 175/16; C09D 175/15; C08F 299/065; C08L 75/16; C09J 151/08; C09J 175/14; C09J 175/16; C09K 3/1021; C09K 2200/065

USPC ...................... 522/96, 90, 1; 520/1
See application file for complete search history.

(56) References Cited

U.S. PATENT DOCUMENTS

| | | | |
|---|---|---|---|
| 4,064,194 A | 12/1977 | Evans et al. | |
| 6,559,260 B1* | 5/2003 | Fan ................ | C08G 18/6715 |
| | | | 522/174 |
| 8,268,104 B1 | 9/2012 | Campfield | |
| 10,858,474 B2 | 12/2020 | Zhou et al. | |
| 2003/0210879 A1 | 11/2003 | Oshio | |
| 2010/0130675 A1 | 5/2010 | Panther | |
| 2011/0262755 A1 | 10/2011 | Panther | |
| 2012/0165498 A1 | 6/2012 | Kitano et al. | |
| 2013/0144000 A1 | 6/2013 | Matsumoto et al. | |
| 2018/0273796 A1* | 9/2018 | Smith ............ | C09D 133/10 |

FOREIGN PATENT DOCUMENTS

| | | | | |
|---|---|---|---|---|
| EP | 0342840 A2 | 11/1989 | | |
| JP | 406234823 A | 8/1994 | | |
| JP | 2003201331 A2 | 7/2003 | | |
| JP | 2004204095 A2 | 7/2004 | | |
| WO | WO-2011021363 A1 * | 2/2011 | ......... | C08G 18/4825 |
| WO | WO-2014010933 A1 | 1/2014 | | |
| WO | WO-201516961 A1 | 11/2015 | | |

(Continued)

OTHER PUBLICATIONS

Senyurt et al, Thermal and mechanical Properties of Cross-Linked Photopolymers Based on Multifunctional Thiol-Urehtane Ene Monomers, 2007, Macromolecules, 40, 3174-3182 (Year: 2007).*

(Continued)

*Primary Examiner* — Jessica Whiteley
(74) *Attorney, Agent, or Firm* — Christopher R. Lewis

(57) ABSTRACT

A urethane oligomer according to a) or b) has: a) at least two backbone residues R issued from a polyisocyanate without the NCO groups, linked between them with a diol residue $R_B$ (diol without the two OH groups) by two urethane bonds and each backbone residues R carrying (or linked to) at least two urethane segments each containing at least one terminal allyl group, b) at least one backbone residue R issued from a polyisocyanate without the NCO groups, the backbone residue R carrying (or linked to) at least two urethane segments each linked to R by one urethane bond with at least one urethane segment (arm) containing at least one terminal allyl group, and at least one urethane segment (arm) containing at least one terminal (meth)acrylate group. A curable composition containing the urethane oligomer reduces oxygen inhibition in coatings, adhesives, sealants or in resin matrix with good surface properties.

23 Claims, No Drawings

(56) References Cited

FOREIGN PATENT DOCUMENTS

WO      WO2016176389 A1     11/2016
WO      WO-2018066033 A1 *   4/2018   ............. C09J 11/06

OTHER PUBLICATIONS

Kitano et al., WO 2011021363 Machine Translation, Feb. 24, 2011 (Year: 2011).*
Park et al, Effects of Molar Ratios of Thiol-Ene Monomers on the Morphology and Electro-Optical Properties of pOlymer Dispersed Liquid Crystal Films, 2013, Open Journal of Organic Polymer Materials, 3, 92-98 (Year: 2013).*
Hara et al, WO 2018-066033 Machine Translation, Apr. 12, 2018 (Year: 2018).*
International Search Report for PCT/CN2017/098399 Filed Aug. 22, 2017.

\* cited by examiner

ALLYL FUNCTIONAL URETHANE OLIGOMERS AND RELATED COMPOSITIONS FOR COATINGS AND ADHESIVES

CROSS-REFERENCE TO RELATED APPLICATIONS

This application is a U.S. national stage application under 35 U.S.C. § 371 of international application number PCT/CN2017/098399, filed Aug. 22, 2017.

FIELD OF THE INVENTION

The present invention relates to urethane oligomers with allyl and more particularly allyl and (meth)acrylate groups, with good surface drying properties by reducing oxygen inhibition, a method of producing the urethane oligomers and their specific uses in curable compositions in particular in ultraviolet (UV) curable surface dry coating applications.

BACKGROUND OF THE INVENTION

Compared to traditional solvent based coatings, the principal advantage of UV curable coating is the environmental friendly solvent-free formulations with no volatile organic compound (VOC). Urethane acrylate oligomers are often used in coating composition with acrylate monomers as reactive diluents. By formulating with photo-initiators, UV coating are cured by photo-chemically initiated radical polymerization which would result in an incomplete cure with tacky surface due to the oxygen inhibition from atmosphere. Oxygen inhibits the curing by quenching the excited triplet state of photo-initiator and scavenging the radicals to form per-oxy radicals to terminate polymerization. This oxygen inhibition effect results in reduced properties or tacky surface on the coating. In extreme cases such as low intensity cure processes would result in uncured liquid surface.

Strategies to reduce the oxygen inhibition in industry process have been investigated in the past decades. Physical ways includes removing oxygen with inert gas such as nitrogen, or forming a barrier on surface using wax. Chemical ways includes increasing free radical concentration by formulating with higher content of photo-initiator, or using chemicals to react with per-oxy radicals, or using UV cationic epoxy to eliminate oxygen inhibition.

U.S. Pat. No. 8,268,104 reported using cationic epoxy to repair cracks on windshields which eliminates oxygen inhibition and shrinkage. However, application of this strategy is limited when epoxy could not provide the required properties and acrylates must be used. In fact, most of the UV coating systems could not be replaced by cationic epoxies.

In industry, about 3-5% (w/w) photo-initiator is added to generate enough free radicals under UV irradiation for polymerization. Oxygen inhibition could be reduced by formulating with even more than 10% (w/w) photo-initiator to increase the concentration of radicals. Due to the high cost of photo-initiators, the final product would be more expensive with higher content of photo-initiator. Another aspect is that the final formulation will be compromised and properties after curing could be affected. Moreover, since photo-initiators are small molecules, it's derives migrates even after curing. In many industries such as food packaging, migration of organic compounds is restricted.

One alternative way to eliminate oxygen inhibition effect is excluding oxygen by inert gas such as nitrogen while curing the compositions. In many cases, this process means that special designed and manufactured system is requested, which is not economically feasible and could be extraordinary costly.

Despite current effects to reduce oxygen inhibition effect in UV curing compositions, it still needs new oligomers with fast curing, air drying properties.

SUMMARY OF THE INVENTION

A subject of the present invention relates to a urethane oligomer, wherein according to a) or b) as follows, it has:
a) at least two backbone residues R issued from a polyisocyanate without the NCO groups, linked between them with a diol residue $R_B$ (diol without the two OH groups) by two urethane bonds (—NHCOO—) and each of said backbone residues R carrying (or linked to) at least two urethane segments each one of which, contains at least one terminal allyl group, preferably from 1 to 5 terminal allyl groups,
b) at least one backbone residue R issued from a polyisocyanate without the NCO groups, said backbone residue R carrying (or linked to) at least two urethane segments each linked to R by one urethane bond with
  at least one urethane segment (arm) containing at least one terminal allyl group, preferably from 1 to 5 terminal allyl groups, and
  at least one urethane segment (arm) containing at least one terminal (meth)acrylate group, preferably from 1 to 5 terminal (meth)acrylate groups.

Another subject relates to a method for preparing said urethane oligomer.

Another subject relates to a curable composition comprising at least one of said urethane oligomers according to the present invention.

Another subject covered by the present invention relates to the use of said urethane oligomer in curable compositions in the presence of air.

Finally the present invention covers a finished product selected from the group consisting of a coating, an adhesive, a sealant or a resin matrix, which results from the curing of the urethane oligomer or of the curable composition as defined according to the invention.

DETAILED DESCRIPTION

According to the present invention, the term "urethane oligomer" means a compound containing at least two —NH—CO—O— (urethane) moieties.

In an embodiment of the present invention, the urethane oligomer comprises at least one backbone which is a polyisocyanate residue (polyisocyanate after removing all NCO groups) and two types of urethane arms (also called urethane segments in the text).

In an embodiment of the present invention, the urethane oligomer consists of at least one backbone as defined above and of two types of urethane arms (urethane segments).

The first type of the urethane arm is a urethane arm containing at least one allyl group, wherein said at least one allyl group is a terminal group of the urethane oligomer.

The second type of the urethane arm is a urethane arm containing at least one (meth)acrylate group, wherein said at least one (meth)acrylate group is a terminal group of the urethane oligomer, or a urethane arm containing a diol residue, which is located between two backbones, and connected to each of two backbones via a connecting group of urethane —NHCOO—.

According to the present invention, the term "backbone" residue is a moiety formed by removing all of NCO groups from a polyisocyanate (polyisocyanate residue).

A first subject of the invention relates to a urethane oligomer which according to options to a) or b) as follows, it has:

a) at least two backbone residues R issued from a polyisocyanate without the NCO groups, linked between them with a diol residue $R_B$ (diol without the two OH groups) by two urethane bonds (—NHCOO—) and each of said backbone residues R carrying (or linked to) at least two urethane segments each one of which, contains at least one terminal allyl group, preferably from 1 to 5 terminal allyl groups, b) at least one backbone residue R issued from a polyisocyanate without the NCO groups, said backbone residue R carrying (or linked to) at least two urethane segments each linked to R by one urethane bond with at least one urethane segment (arm) containing at least one terminal allyl group (preferably from 1 to 5 terminal allyl groups), and at least one urethane segment (arm) containing at least one terminal (meth)acrylate group (preferably from 1 to 5 terminal (meth)acrylate groups).

More particularly the urethane oligomer according to the present invention can be represented by the following general formulae, (I-a) representing option a) as defined above and (I-b) representing option b) as defined above:

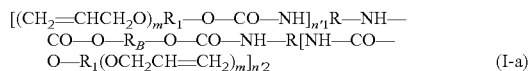

(I-a)

wherein m>0, preferably m=1 to 5 independently or dependently in each occurrence, n'1>0, n'2>0, with n'=n'1+n'2 from 2 to 10, preferably 2 to 6, each of m, n'1 and n'2 is an integer, and with n'1=n'2=n1+n2−1 with n1+n2=n being the functionality of said polyisocyanate (or valency of R) and varying from 2 to 6, preferably from 2 to 4, each of n1 and n2 is an integer with n1 and n2 being identical or different; or

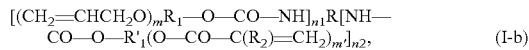

(I-b)

wherein $R_2$ is H or $CH_3$;
wherein
n=n1+n2≥2 and up to 6, preferably 2 to 4, n represent the functionality of the said polyisocyanate or the valency of the residue R derived from said polyisocyanate,
n1>0, n2>0, m>0, m'>0, preferably m=1 to 5, m'=1 to 5, n>0, each of m, m', n, n1 and n2 are integers with n1 and n2 being identical or different;
m', integer from 1 to 5 which is identical to or different from m;
wherein
the backbone residue R is a moiety formed by removing all of NCO groups from a polyisocyanate; said polyisocyanate may be monomeric (without repeating unit) or oligomeric (with a repeating unit) and may comprise allophanate group, uretidine dione cycle group (for a dimer) or isocyanurate cycle group (for a trimer).
$R_1$ is independently or dependently in each occurrence a (m+1)-valent group in particular selected from $C_2$-$C_{12}$, e.g. $C_2$-$C_{10}$ or $C_2$-$C_6$, or $C_2$-$C_3$ aliphatic (e.g. saturated) group or from an (m+1)-valent oligomeric group or a combination thereof;

$R'_1$ is a (m'+1)-valent group in particular selected from $C_2$-$C_{12}$, e.g. $C_2$-$C_{10}$ or $C_2$-$C_6$, or $C_2$-$C_3$ aliphatic (e.g. saturated) group or from an (m'+1)-valent oligomeric group or a combination thereof, wherein $R_1$ and $R'_1$ can be identical or different;
m is an integer from 1 to 5, e.g. 1, 2, 3, 4, 5; preferably from 1 to 3;
the diol residue $R_B$ is a moiety formed by removing the two hydroxyl groups from a diol.

According to the present invention, the term "urethane segment or arm" means a chain group containing urethane —NH—CO—O— sub-group (bond), and includes the following groups:

(a') —NH—CO—O—$R_1$(OCH$_2$CH=CH$_2$)$_m$
(b') —NH—CO—O—$R'_1$(O—CO—C($R_2$)=CH$_2$)$_{m'}$
(c') —NH—CO—O—$R_B$—O—CO—NH—

$R_1$ (as the linker) is a (m+1)-valent group in particular selected from $C_2$-$C_{12}$, e.g. $C_2$-$C_{10}$ or $C_2$-$C_6$, or $C_2$-$C_3$ aliphatic (e.g. saturated) group or an (m+1)-valent oligomeric group or a combination thereof;
$R'_1$ (as the linker) is a (m'+1)-valent group in particular selected from $C_2$-$C_{12}$, e.g. $C_2$-$C_{10}$ or $C_2$-$C_6$, or $C_2$-$C_3$ aliphatic (e.g. saturated) group or an (m'+1)-valent oligomeric group or a combination thereof;
$R_B$ (as the diol residue) is a moiety formed by removing two hydroxyl groups from a diol;
wherein $R_2$ is H or $CH_3$;
wherein m>0, m'>0, and each of m and m' is an integer.

According to the present invention, the term "linker" $R_1$ is a (m+1)-valent group in particular selected from $C_2$-$C_{12}$, e.g. $C_2$-$C_{10}$ or $C_2$-$C_6$, or $C_2$-$C_3$ aliphatic (e.g. saturated) group or an (m+1)-valent oligomeric group or a combination thereof (e.g. the (m+1)-valent combination of the aliphatic (e.g. saturated) group and the oligomeric group), and the term "linker" $R'_1$ is a (m'+1)-valent group in particular selected from $C_2$-$C_{12}$, e.g. $C_2$-$C_{10}$ or $C_2$-$C_6$, or $C_2$-$C_3$ aliphatic (e.g. saturated) group or an (m'+1)-valent oligomeric group or a combination thereof (e.g. the (m'+1)-valent combination of the aliphatic (e.g. saturated) group and the oligomeric group), wherein said oligomeric segment is selected from an oligoester segment, an oligoether segment, an oligourethane segment and a combination thereof. In an embodiment, said oligomeric segment comprises 2-50, preferably 2-30, e.g. 2-4 repeating units. According to the present invention, $R_1$ and $R'_1$ can be identical or different.

According to the present invention, the term "backbone" residue R is a moiety formed by removing all of NCO groups from a polyisocyanate (polyisocyanate residue).
Polyisocyanate In the present invention, the term "polyisocyanate" refers to a compound containing at least two —NCO groups, preferably from 2 to 6 —NCO groups and more preferably from 2 to 4 —NCO groups. The polyisocyanate can be an aliphatic polyisocyanate, an aromatic polyisocyanate, or a cycloaliphatic polyisocyanate.

In an embodiment, the polyisocyanate may have 6 to 18 carbon atoms, preferably 6 to 12 carbon atoms, except for those contained in the NCO groups. The lower number of carbon atoms, $C_2$ to $C_5$, is not preferred since low-C isocyanate compounds are generally too volatile for any practical use, and would exert toxicity.

The isocyanate compounds preferably include, but not limited to, isophorone diisocyanate (IPDI), toluene diisocyanate (TDI), dicyclohexylmethane 4,4'-diisocyanate (MDI), hexamethylene diisocyanate, 4,4'-methylenebis(phenylisocyanate), xylenediisocyanate, octadecyl isocyanate, 1,5-naphthylene diisocyanate, dianisidine diisocyanate, and polymethylene polyphenylisocyanates. The polyisocyanates may be dimers (comprising uretidine dione cycle) or trimers (comprising isocyanurate cycle). They may also contain allophanates, isocyanurates, uretinediones, biurets, more particularly derived from hexamethylene diisocyanate, isophorone diisocyanate or toluene diisocyanate.

Examples of polyisocyanates also include:

- an aliphatic diisocyanate, and the specific example includes hexamethylene diisocyanate and its dimer (uretidine dione cycle)) and trimer (isocyanurate) derivatives, heptane diisocyanate, 2,2-dimethylpentane diisocyanate, 3-methoxyhexane diisocyanate, octane diisocyanate, 2,2,4-trimethylpentane diisocyanate, nonane diisocyanate (e.g. 1,6-diisocyanato-2,2,4-trimethylhexane, 1,6-diisocyanato-2,4,4-trimethylhexane), decane diisocyanate, 3-butoxyhexane diisocyanate, 1,4-butylene glycol dipropyl ether-ω,ω'-diisocyanate, undecane diisocyanate, dodecane diisocyanate and thiodihexyl diisocyanate;
- an aliphatic diisocyanate having a cyclic group, and the specific example includes ω,ω'-1,3-dimethylbenzene diisocyanate, ω,ω'-1,2-dimethylbenzene diisocyanate, ω,ω'-1,2-dimethylcyclohexane diisocyanate, ω,ω'-1,4-dimethylcyclohexane diisocyanate, ω,ω'-1,4-diethylbenzene diisocyanate, ω,ω'-1,4-dimethylnaphthalene diisocyanate, ω,ω'-1,5-dimethylnaphthalene diisocyanate, 3,5-dimethylcyclohexane-1-methylisocyanate-2-propyl isocyanate and ω,ω'-n-propyl-biphenyl diisocyanate;
- a benzene diisocyanate, and the specific example includes 1,3-phenylene diisocyanate, 4-chloro-6-methyl-1,3-phenylene diisocyanate, 1,4-phenylene diisocyanate, toluene diisocyanate (TDI), isomers such as 1-methylbenzene-2,4-diisocyanate, 1-methylbenzene-2,5-diisocyanate, and 1-methylbenzene-3,5-diisocyanate, 1,3-dimethylbenzene-2,4-diisocyanate, 1,3-dimethylbenzene-4,6-diisocyanate, 1,4-dimethylbenzene-2,5-diisocyanate, 1-ethylbenzene-2,4-diisocyanate, 1-isopropylbenzene-2,4-diisocyanate, diethylbenzene diisocyanate, diisopropylbenzene diisocyanate, p-xylylene diisocyanate, m-xylylene diisocyanate, p-tetramethylxylylene diisocyanate, and m-tetramethylxylylene diisocyanate;
- a naphthalene diisocyanate, and the specific example includes 1,4-diisocyanatonaphthalene, 1,5-diisocyanatonaphthalene, 1,6-diisocyanatonaphthalene, 1,7-diisocyanatonaphthalene, 2,3-diisocyanatonaphthalene, 2,4-diisocyanatonaphthalene, 2,5-diisocyanatonaphthalene, 2,6-diisocyanatonaphthalene, 2,7-diisocyanatonaphthalene, and 2,2'-diisocyanato-1,1'-binaphthyl;
- a biphenyl diisocyanate, and the specific example includes biphenyl-2,4'-diisocyanate, biphenyl-4,4'-diisocyanate, 3,3'-dimethylbiphenyl-4,4'-diisocyanate, 3,3'-dimethoxybiphenyl-4,4'-diisocyanate, 3,3'-dichlorobiphenyl-4,4'-diisocyanate, and 2-nitrobiphenyl-4,4'-diisocyanate;
- a di- or triphenylmethane diisocyanate and a di- or triphenylethane diisocyanate, and the specific example includes diphenylmethane-4,4'-diisocyanate, 2,2'-dimethyldiphenylmethane-4,4'-diisocyanate, diphenyldimethylmethane-4,4'-diisocyanate, 2,5,2',5'-tetramethyldiphenylmethane-4,4'-diisocyanate, 3,3'-dimethoxydiphenylmethane-4,4'-diisocyanate, 4,4'-dimethoxyphenylmethan-3,3'-diisocyanate, 4,4'-diethoxyphenylmethane-3,3'-diisocyanate, 2,2'-dimethyl-5,5'-dimethoxydiphenylmethane-4,4'-diisocyanate, 3,3-dichlorodiphenyldimethylmethane-4,4'-diisocyanate, benzophenone-3,3'-diisocyanate, α,β-diphenylethane-2,4-diisocyanate, 3-nitrotriphenylmethane-4,4'-diisocyanate, 4-nitrotriphenylmethane-4,4'-diisocyanate, and derivatives thereof;
- a triisocyanate, and the specific example includes 1-methylbenzene-2,4,6-triisocyanate, 1,3,5-trimethylbenzene-2,4,6-triisocyanate, naphthalene-1,3,7-triisocyanate, biphenyl-1,3,7-triisocyanate, diphenylmethane-2,4,4'-triisocyanate, 3-methyldiphenylmethane-4,6,4'-triisocyanate, triphenylmethane-4,4',4"-triisocyanate, diphenyl-4,4'-diisocyanatocarbamic acid chloride, and derivatives thereof;
- an alicyclic diisocyanate, said alicyclic (cycloaliphatic) diisocyanate compound has a structure containing an alicyclic hydrocarbon or a polyalicyclic hydrocarbon and two isocyanate groups bonded thereto directly or via an alkylene group, and the specific example includes: isophorone diisocyanate (i.e., 5-isocyanato-1-(isocyanatomethyl)-1,3,3-trimethylcyclohexane), 1,2-bis(isocyanatomethyl)cyclohexane, 1,3-bis(isocyanatomethyl)cyclohexane, 1,4-bis(isocyanatomethyl)cyclohexane, 2-(2-isocyanatoethyl)-1-(isocyanatomethyl)-3,5-dimethylcyclohexane, and bis(4-isocyanatocyclohexyl)methane;
- a diisocyanate represented by the general formula shown below

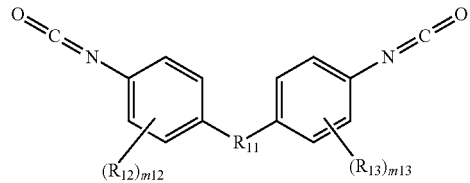

wherein $R_{11}$ represents an alkylene group selected from a methylene group, an ethylene group, —O—, and a —C(CH$_3$)$_2$— group; $R_{12}$ and $R_{13}$ each independently represents a group selected from an alkyl group having 4 or less carbon atoms, an alkoxy group having 4 or less carbon atoms and a halogen atom; $m_{12}$ and $m_{13}$ each independently represents an integer of from 0 to 4; and when $m_{12}$ and/or $m_{13}$ represents 2 or more, plural $R_{12}$s and/or $R_{13}$s may be the same or different from one another; and its specific example includes: bis(4-isocyanatophenyl)methane, bis(4-isocyanato-2-methylphenyl)methane, bis(4-isocyanato-2,5-dimethylphenyl)methane, bis(4-isocyanato-3-methoxyphenyl)methane, bis(4-isocyanato-5-methoxy-2-methylphenyl)methane, bis(3-chloro-4-isocyanatophenyl)methane, 1,2-bis(4-isocyanatophenyl)ethane, 4,4'-oxybis(isocyanatobenzene), and derivatives thereof;

- a polyalicyclic diisocyanate represented by the following general formula:

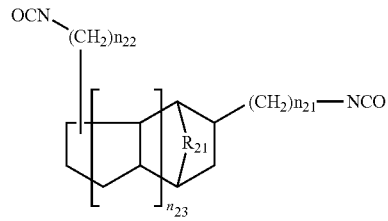

wherein R$_{21}$ represents a group selected from a single bond, a methylene group, an ethylene group or a —C(CH$_3$)$_2$— group, n$_{21}$ and n$_{22}$ each represents an integer of 1-5, and n$_{23}$ represents an integer of 0-2. Examples thereof include norbornane diisocyanate represented by the following formula:

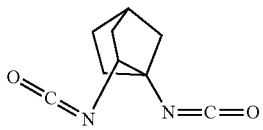 [SMILES: O=C=NC1CC2CCC1(N=C=O)C2]

a dimer or a trimer of the above polyisocyanates, e.g. HDI trimer.

other polyisocyanates, including poly(propylene glycol), tolylene 2,4-diisocyanate terminated (CAS: 9057-91-4);
(2,4,6-trioxotriazine-1,3,5(2H,4H,6H)-triyl)tris(methyl-m-phenylene) isocyanate (CAS: 26603-40-7);
C(CH$_2$O(CH$_2$CH$_2$O)$_n$CH$_2$CH$_2$NCO)$_4$ (average Mn 10000-20000);
poly[(phenyl isocyanate)-co-formaldehyde] (average Mn: 340-400, CAS: 9016-87-9);

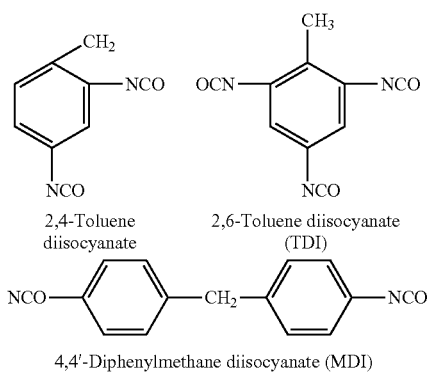

2,4-Toluene diisocyanate
2,6-Toluene diisocyanate (TDI)

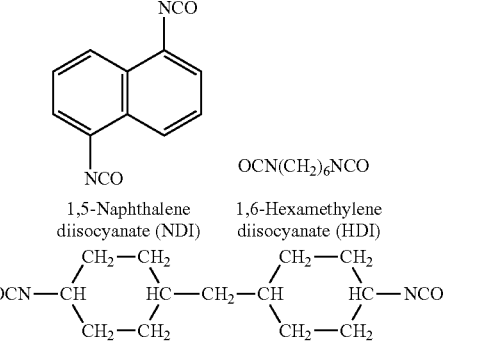

4,4'-Diphenylmethane diisocyanate (MDI)

1,5-Naphthalene diisocyanate (NDI)
1,6-Hexamethylene diisocyanate (HDI)

4,4'-Dicyclomethane diisocyanate (H$_{12}$MDI)

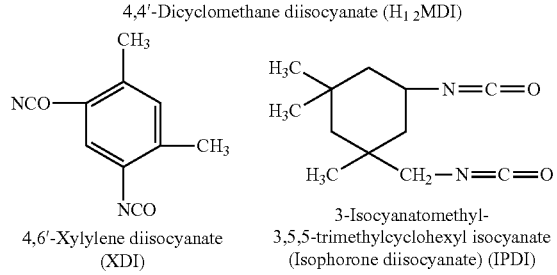

4,6'-Xylylene diisocyanate (XDI)
3-Isocyanatomethyl-3,5,5-trimethylcyclohexyl isocyanate (Isophorone diisocyanate) (IPDI)

-continued

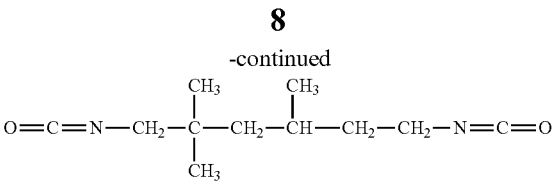

2,2,4-(2,4,4-)Trimethylhexamethylene diisocyanate.
(2,2,4-Trimethyl-1,6-hexamethylene diisocyanate) (TMDI)

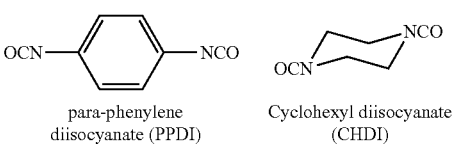

para-phenylene diisocyanate (PPDI)
Cyclohexyl diisocyanate (CHDI)

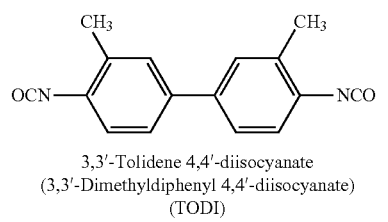

3,3'-Tolidene 4,4'-diisocyanate
(3,3'-Dimethyldiphenyl 4,4'-diisocyanate) (TODI)

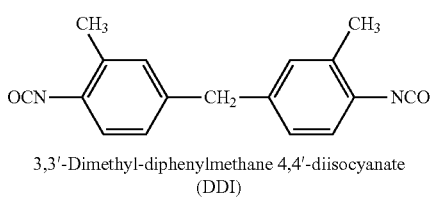

3,3'-Dimethyl-diphenylmethane 4,4'-diisocyanate (DDI)

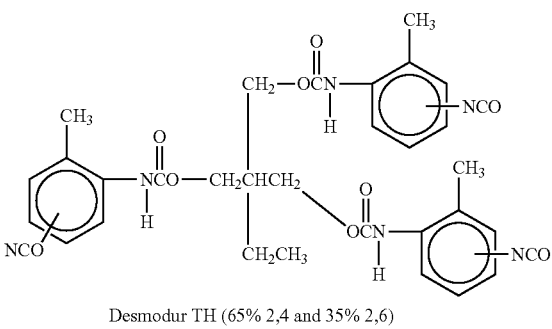

Desmodur TH (65% 2,4 and 35% 2,6)

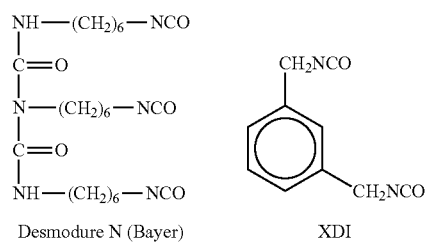

Desmodure N (Bayer)
XDI

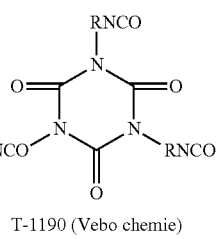

T-1190 (Vebo chemie)

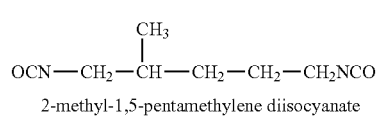

2-methyl-1,5-pentamethylene diisocyanate

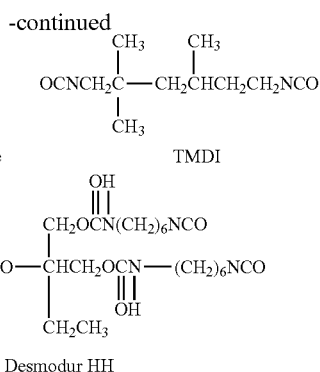

-continued 1,12-dodecanodiisocyanate

TMDI

Desmodur HH

For more information about polyisocyanates, a reference may be made to SZYCHER'S HANDBOOK OF POLY-URETHANES. Second Edition. Michael Szycher, Ph.D. CRC Press. Taylor & Francis Croup. Boca Raton. London New York (2013).

According to a specific embodiment of the invention, the linker $R_1$ and/or $R'_1$ is/are an oligomeric segment selected from the group consisting of: an oligoester segment, an oligoether segment, an oligourethane segment and a combination thereof; and/or the diol corresponding to said diol residue $R_B$ in formula (I-a) is preferably selected from alkane diols, in particular $C_2$-$C_{10}$ alkane diols, cycloalkane diols in particular $C_5$-$C_{10}$ more preferably $C_6$-$C_{10}$cycloalkane diols, aromatic diols e.g. $C_8$-$C_{12}$ aromatic diols, oligoether diols, oligoester diols, and oligourethane diols.

Diol

According to the present invention, the term "diol residue" $R_B$ is a moiety formed by removing the two hydroxyl groups from a diol $R_B(OH)_2$. The term "diol" refers to a compound containing two —OH groups and bearing none ethylenic unsaturation. Diol includes alkane diols (e.g. $C_2$-$C_{10}$alkane diols), cycloalkane diols (e.g. $C_5$-$C_{10}$cycloalkane diols), and aromatic diols (e.g. $C_8$-$C_{12}$ aromatic diols), wherein the cycloalkane diols and the aromatic diols can be represented by (OH—$C_{0-2}$alkylene)-cyclic group-($C_{0-2}$alkylene-OH). The diol further comprises oligoether diols, oligoester diols, and oligourethane diols. The oligoether diol is a diol formed by oligomerization of alkylene oxides like ethylene oxide, propylene oxide or butylene oxide (also called tetrahydrofuran or THF). The oligoester diol is a diol formed by oligo-condensation between diols and dicarboxylic acids or corresponding anhydrides (such as those specifically described hereinafter) with an excess of OH groups vs $CO_2H$ groups or by post-reaction of carboxy terminal groups with an excess of a diol. The oligourethane diol is a diol formed by oligo-condensation between diols and diisocyanates (such as those specifically described hereinbefore) with an excess of OH groups vs —NCO groups or by post-reaction of the NCO terminal groups with an excess of a diol.

Specific diol examples include: 1,2-ethanediol, 1,2-propanediol, 1,3-propanediol, 1,3-butanediol, 1,4-butanediol, 2,3-butanediol, 2-methyl-1,3-propanediol, 1,5-pentanediol, 2,2-dimethyl-1,3-propanediol, 1,6-hexanediol, 2,5-hexanediol, 2-methyl-2,4-pentanediol, 2-methyl-2-ethyl-1,3-propanediol, 2,2-dimethyl-1,4-butanediol, 2,2-diethyl-1,3-propanediol, 1,8-octanediol, 2,2,4-trimethyl-1,3-pentanediol, 2,2,4-trimethyl-1,5-pentanediol, 2-ethyl-1,3-hexanediol, 2-methyl-2-butyl-1,3-propanediol, 2-ethyl-2-butyl-1,3-propanediol; 1,4-dimethylolcyclohexane, 1,4-diethanolcyclohexane, dihydroxycyclopentane, 1,4-cyclohexanediol, cyclohexane-1,1-diyldimethanol; diethylene glycol, dipropylene glycol, triethylene glycol, tripropylene glycol, dibutylene glycol, tributylene glycol; and hydroquinone, bisphenol A, dihydroxymethyl benzene, Dicarboxylic Acid (for an Oligoester Diol Residue $R_B$)

In the present invention, the dicarboxylic acid can be a substituted or unsubstituted, linear or branched, non-aromatic dicarboxylic acids, selected from aliphatic dicarboxylic acids containing 2 to 12 carbon atoms and cycloaliphatic dicarboxylic acids containing 5 to 10 carbon atoms, or a substituted or unsubstituted aromatic dicarboxylic acids containing 6 to 10 carbon atoms. The substituted aromatic or non-aromatic dicarboxylic acids will typically contain 1-4 substituents selected from halo, $C_1$-$C_6$alkyl, $C_6$-$C_{10}$aryl, and $C_1$-$C_4$alkoxy.

Specific dicarboxylic acid examples include succinic acid, glutaric acid, adipic acid, azelaic acid, sebacic acid, fumaric acid, maleic acid, itaconic acid, 1,3-cyclohexane dicarboxylic acid, 1,4-cyclohexanedicarboxylic acid, diglycolic acid, 2,5-norbornane-dicarboxylic acid, phthalic acid, terephthalic acid, 1,4-naphthalenedicarboxylic acid, 2,5-naphthalene-dicarboxylic acid, 2,6-naphthalenedicarboxylic acid, 2,7-naphthalenedicarboxylic acid, diphenic acid, 4,4'-oxydibenzoic acid, 4,4'-sulfonyldibenzoic acid, isophthalic acid, and combinations thereof.

Substituent

Herein, the term "substituent" refers to halo, $C_1$-$C_6$alkyl, $C_6$-$C_{10}$aryl, and $C_1$-$C_4$alkoxy, and the term "can be substituted" and the like mean "being optionally substituted by 1-4 substituents selected from halo, $C_1$-$C_6$alkyl, $C_6$-$C_{10}$aryl, and $C_1$-$C_4$alkoxy".

Oligomeric Segments

The total number of repeating units is less than 100, e.g. preferably less than 50, less than 25, for example, 10, 9, 8, 7, 6, 5, 4 and 3.

The oligomeric segment according to the present invention includes:

an oligoester segment which is a moiety consisting of the repeating units —OR'—CO— or —OR'—COO—R"—CO—; wherein said R' and R" are different; or which is derived by removing H and OH from an oligoester $H(O-R''-O-OC-R'-CO)_nOH$ based on a diacid $HO_2C-R'-CO_2H$ and a diol $HO-R''-OH$, n" is an integer of 2-10, an oligoether segment which is a moiety consisting of the repeating units —O—R'— or —O—R'—O—R"—;

an oligourethane segment which is a moiety consisting of the repeating units —OR'O—OC—HN—R"—NH—CO—;

wherein said R' and R" are identical or different, and selected from an aliphatic (bivalent) group containing 2 to 12 carbon atoms. e.g. $C_2$-$C_4$ alkylene, a cycloaliphatic group containing 5 to 10 carbon atoms, or an aromatic group containing 8 to 10 carbon atoms. R' and R" can be substituted.

In an embodiment, said oligoester segment is derived from one or more $C_4$-$C_6$ lactones, e.g. one or more caprolactones.

In an embodiment of the present invention, the urethane segment (arm) containing at least one terminal allyl group comprises 1 to 5 allyl groups, e.g. 1, 2, 3, 4, 5 allyl groups, which are terminal groups of said urethane oligomer and the urethane segment (arm) containing at least one terminal (meth)acrylate group comprises 1-5 (meth)acrylate groups, e.g. 1, 2, 3, 4, 5 (meth)acrylate groups, which are terminal groups of said urethane oligomer.

In an embodiment of the present invention, in the oligomer according to formula I-a, the at least two urethane arms each containing at least one terminal allyl group contains from 1 to 3 terminal allyl groups, e.g. 1, 2, 3; in particular 3, and in said formula I-b, the at least one urethane segment containing at least one terminal allyl groups contains from 1 to 3 terminal allyl groups and the at least one urethane segment containing at least one terminal (meth)acrylate group contains from 1 to 3 terminal (meth)acrylate groups.

According to a specific embodiment said urethane oligomer has an average in number molecular weight Mn measured by GPC in THF with polystyrene standards, from 250 to 5000 g/mol, e.g. 500 to 5000 g/mol, preferably from 750 to 3000 g/mol, or preferably from 650 to 3000 g/mol.

The present invention also relates to a urethane oligomer obtainable from the reaction of
(1) at least one polyisocyanate (III) R(NCO)n with n=n1+n2 having at least two isocyanate groups (n of at least 2), preferably 2 to 6 isocyanate groups (preferably n=2 to 6) and more preferably 2 to 4 isocyanate groups (more preferably n=2 to 4), both of n1 and n2 are an integer>0;
(2) at least one monoalcohol (II) having at least one allyl group (m=at least 1) as terminal group, preferably 1-5 terminal allyl groups (m=1 to 5) and more preferably 1 to 3 terminal allyl groups (m=1 to 3); and
one or both of the following two:
(3-b) at least one monoalcohol (IV) having at least one (meth)acrylate group as terminal group (m'=at least 1), preferably 1 to 5 terminal (meth)acrylate groups (m'=1 to 5) more preferably 1 to 3 terminal allyl groups (m'=1 to 3) and
(3-a) at least one diol (V) $R_B(OH)_2$ bearing none ethylenic unsaturation, preferably selected from alkane diols in particular $C_2$-$C_{10}$ alkane diols, cycloalkane diols in particular $C_5$-$C_{10}$ cycloalkane diols, preferably $C_6$-$C_{10}$, aromatic diols in particular $C_8$-$C_{12}$ e.g. $C_8$-$C_{10}$ aromatic diols, oligoether diols, oligoester diols, and oligourethane diols.

The monoalcohol (II) having at least one allyl group as terminal group can be represented by $$HO-R_1[O-CH_2CH=CH_2]_m \qquad (II)$$

wherein m is an integer greater than zero which may vary from 1 to 5, more particularly from 1 to 3,
with $R_1$ is a residue derived by removing (m+1) OH groups from a polyol $R_1(OH)_{(m+1)}$, and $R_1$ being an (m+1)-valent group preferably selected from $C_2$-$C_{12}$, e.g. $C_2$-$C_{10}$ or $C_2$-$C_6$, or $C_2$-$C_3$ aliphatic (e.g. saturated) group, or an (m+1)-valent oligomeric group or a combination thereof.

In a particular embodiment, said monoalcohol (II) having at least one allyl group bears only one allyl group and can be selected from the group consisting of allyl alcohol and of at least one ether of allyl alcohol with a diol, wherein in said diol one OH is etherified and the other remains free. Such a diol may be an aliphatic diol (e.g. $C_2$-$C_6$ aliphatic diol) or an oligoether diol or an oligoester diol with in both cases the number of repeating ether or ester units being from 2 to 4. Said aliphatic $C_2$-$C_6$ diols and said oligoester diols may be alkoxylated with at least one alkoxy unit, preferably with 1 to 6 alkoxy units. Said alkoxy can be ethoxy or propoxy or mixture of both and preferably is ethoxy.

In an embodiment, said monoalcohol (II) having at least one allyl group bears two allyl groups, and said monoalcohol can be selected from the group consisting of diethers of aliphatic triols with allyl alcohol. More specific examples are the diallyl diether of trimethylol propane, or diallyl diether of glycerol. Said triols may be alkoxylated as specified above for aliphatic $C_2$-$C_6$ diols and oligoester diols.

In another embodiment, said monoalcohol (II) having at least one allyl group bears three allyl groups, and said monoalcohol can be selected from the group consisting of triethers of aliphatic tetrols with allyl (or allylic) alcohol. Such an example can be the triether of allyl alcohol with the ditrimethylol propane ether or the triether of allylic alcohol with diglycerol ether or the triether of pentaerythritol with allylic alcohol. Said tetrols may be alkoxylated as specified above for aliphatic $C_2$-$C_6$ diols and oligoester diols.

In another embodiment, said monoalcohol (II) having at least one allyl group bears higher allyl functionality (4 and 5), and said monoalcohol (II) can be selected from multiethers of pentols (like xylitol) and of hexols (like dipentaerythritol ether) with allyl alcohol.

In another specific embodiment of the invention, said monoalcohol (IV) having at least one (meth)acrylate group is selected from:
trimethylolpropane diallyl ether

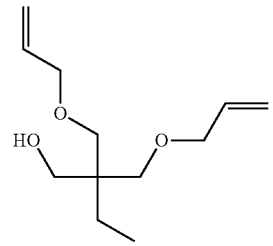

The monoalcohol (IV) having at least one (meth)acrylate group as terminal group can be represented by H-A-[($R_3$)$_y$—O—COC$R_2$=CH$_2$]$_{m'}$
wherein $R_2$ is H or $CH_3$;
wherein m' is an integer greater than zero, which can vary from 1 to 5, more particularly from 1 to 3;
A is an (m'+1)-valent oligomeric segment, and said oligomeric segment is selected from an oligoester segment, an oligoether segment and an oligourethane segment, wherein in the case of said oligoester segment A, it corresponds to the residue of an oligoester diol or to the residue of an oligolactone bearing one terminal hydroxyl group and one terminal carboxy group, by removing one H and one OH per each terminal group (including removing an OH from the terminal carboxy —C(=O)—OH group in the oligolactone, the corresponding terminal group of the residue A becoming —C(=O)—); in the case of said oligoether segment A, it corresponds to the residue of an oligoether diol with one terminal OH and one terminal H removed and; finally in the case of said oligourethane segment A, it corresponds to an oligourethane diol with one terminal OH and one terminal H removed;
$R_3$ is oxyethylene or oxypropylene, and y is 0, 1 or 2; with the proviso that when A is an oligolactone segment, then y=1 or 2.

In another specific embodiment, said monoalcohol (IV) having at least one (meth)acrylate group bears from 1 to 5 (meth)acrylate groups, and said monoalcohol (IV) is the partial ester with (meth)acrylic acid of an oligomeric polyol having an OH functionality from 2 to 6 with said oligomeric segment selected from oligoethers, oligoesters and oligourethanes.

In an embodiment, said monoalcohol (IV) having at least one (meth)acrylate group is a polycaprolactone monoacrylate or monomethacrylate, preferably monoacrylate, which results from the oligomerization of caprolactone in the presence of hydroxyethyl acrylate.

In a specific and preferred embodiment, said monoalcohol (IV) having at least one (meth)acrylate group is selected from:

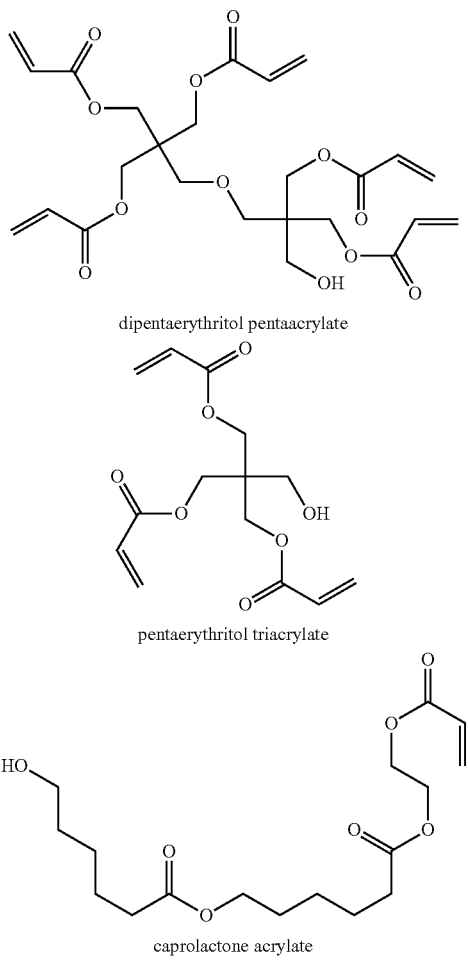

Suitable commercial products corresponding to the above disclosed monoalcohols (IV) are SR 399, SR 444D and SR 495 provided by Sartomer Division of Arkema.

In an embodiment, in the case of presence of both allyl and (meth)acrylate terminal groups, for example according to formula (I-b) as disclosed above, the ratio (allyl)/(Meth)acrylate can vary from 0.1 to 10, in particular from 0.2 to 5.

In an embodiment, said urethane oligomer comprises at least two allyl groups, preferably from 2 to 6 allyl groups.

The urethane oligomer according to the present invention is obtainable from the reaction of
(1) at least one polyisocyanate R(NCO)n with n=n1+n2 having at least two isocyanate groups (n of at least 2), preferably 2 to 6 isocyanate groups (preferably n=2 to 6) and more preferably 2 to 4 isocyanate groups (more preferably n=2 to 4), both of n1 and n2 are an integer>0;
(2) at least one monoalcohol having at least one allyl group (m=at least 1) as terminal group, preferably 1 to 5 allyl groups (m=1 to 5) and more preferably 1 to 3 (m=1 to 3); and one or both of the following two:
(3-b) at least one monoalcohol having at least one (meth)acrylate group as terminal group (m'=at least 1), preferably 1 to 5 (meth)acrylate groups (m'=1 to 5) more preferably 1 to 3 (m'=1 to 3) and
(3-a) at least one diol bearing none ethylenic unsaturation, preferably alkane diols in particular $C_2$-$C_{10}$ alkane diols, cycloalkane diols in particular $C_5$-$C_{10}$ cycloalkane diols, aromatic diols in particular $C_8$-$C_{12}$ aromatic diols, oligoether diols, oligoester diols, and oligourethane diols.

In an embodiment of the present invention, the urethane oligomer is represented by the following general formula (I-1) or (I-2):

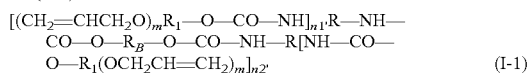  (I-1)

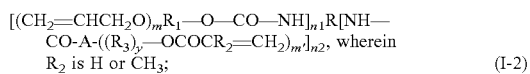  (I-2)

wherein
n1+n2=n is an integer from 2 to 6, in particular 2, 3, 4, 5, 6 preferably from 2 to 4, in particular 2, 3, 4, and both of n1 and n2 are an integer>0;
n1'=n1+n2-1=n2', with n1'+n2'=n' being an integer varying from 2 to 10, in particular 2, 4, 6, 8, 10; preferably from 2 to 8, in particular 2, 4, 6, 8;
m is an integer from 1 to 5, e.g. 1, 2, 3, 4, 5, preferably from 1 to 3;
m' is an integer from 1 to 5, preferably from 1 to 3 and may be identical or different from m;
R is a residue derived by removing n=n1+n2 NCO groups from a polyisocyanate $R(NCO)_{(n1+n2)}$ or derived by removing all of NCO groups from an oligomer (e.g. a dimer or a trimer) of the polyisocyanate $R_0(NCO)_{[(n1+n2)/n3]+1}$;
n3 is the oligomerization degree and can be an integer of 2, 3, 4, 5, 6, preferably 2 or 3;
$R_0$ is selected from an aliphatic, cycloaliphatic or aromatic [[(n1+n2)/n3]+1]-valent group, which can be substituted, e.g. selected from $C_3$-$C_{10}$ aliphatic, $C_6$-$C_{10}$ cycloaliphatic or $C_6$-$C_{14}$ aromatic groups, wherein said $C_3$-$C_{10}$ aliphatic, $C_6$-$C_{10}$ cycloaliphatic or $C_6$-$C_{14}$ aromatic group is optionally substituted;
in case of being derived from the polyisocyanate $R(NCO)_{(n1+n2)}$, the group R is selected from an aliphatic, cycloaliphatic or aromatic n-valent group which can be substituted, in particular selected from $C_6$-$C_{10}$ aliphatic, $C_6$-$C_{10}$ cycloaliphatic or $C_6$-$C_{14}$ aromatic groups, wherein said $C_6$-$C_{10}$ aliphatic, $C_6$-$C_{10}$ cycloaliphatic or $C_6$-$C_{14}$ aromatic group is optionally substituted;
in case of being derived from an oligomer (e.g. a dimer or a trimer) of the polyisocyanate $R_0(NCO)_{[(n1+n2)/n3]+1}$, the group R can be an oligourethane n-valent segment, and for example can be a residue of a dimer or of a trimer of diisocyanate without NCO;
$R_1$ is a (m+1)-valent group selected from $C_2$-$C_{12}$, e.g. $C_2$-$C_{10}$ or $C_2$-$C_6$, or $C_2$-$C_3$ aliphatic (e.g. saturated) group or an (m+1)-valent oligomeric group or a combination thereof,
A is an (m+1)-valent oligomeric segment, selected from an oligoester segment resulting from an oligoester diol or from an oligolactone bearing terminal hydroxyl and carboxy terminal groups by removing one OH and one H per each terminal group (the H of the OH terminal group and the OH of the terminal carboxy group), an oligoether segment and an oligourethane segment respectively resulting by removing the two terminal groups (i.e. one H and one OH) of respectively oligoether diols or of oligourethane diols, in particular said oligoester segment, said oligoether segment and said oligourethane segment being as defined above;

$R_3$ is oxyethylene or oxypropylene, and y is 0, 1 or 2; with the proviso that when A is an oligolactone segment, then y=1 or 2, $R_2$ is —H or —CH$_3$;

$R_B$ is the diol residue as defined above.

The urethane oligomer of the invention may be defined as the reaction product of a monoalcohol represented by formula (II), a polyisocyanate represented by formula (III), and one or both of a monoalcohol represented by formula (IV) and a diol represented by formula (V):

$$HO-R_1[O-CH_2CH=CH_2]_m \quad (II)$$

$$R[NCO]_{n1+n2} \quad (III)$$

$$H\text{-}A\text{-}[(R_3)_y-O-COCR_2=CH_2]_{m'} \quad (IV)$$

$$HO-R_B-OH \quad (V)$$

wherein $R_1$, $R_2$, $R_3$, $R_B$, R, A, m, m', n1+n2, y, are defined as above.

In an embodiment of the present invention, the oligomer of the present invention can be selected from a group consisting of the following formulae 001 to 007:

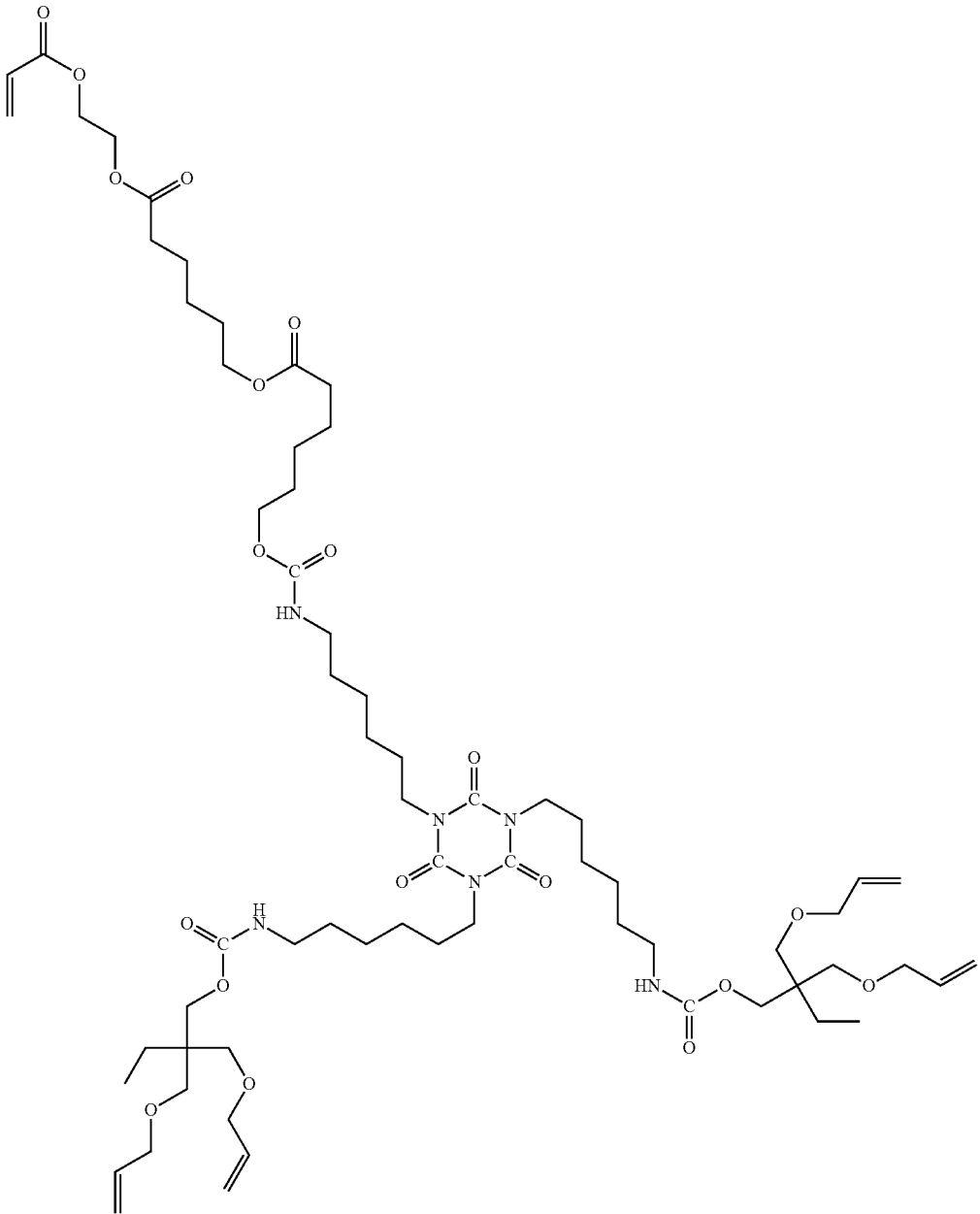

(001)

(002)
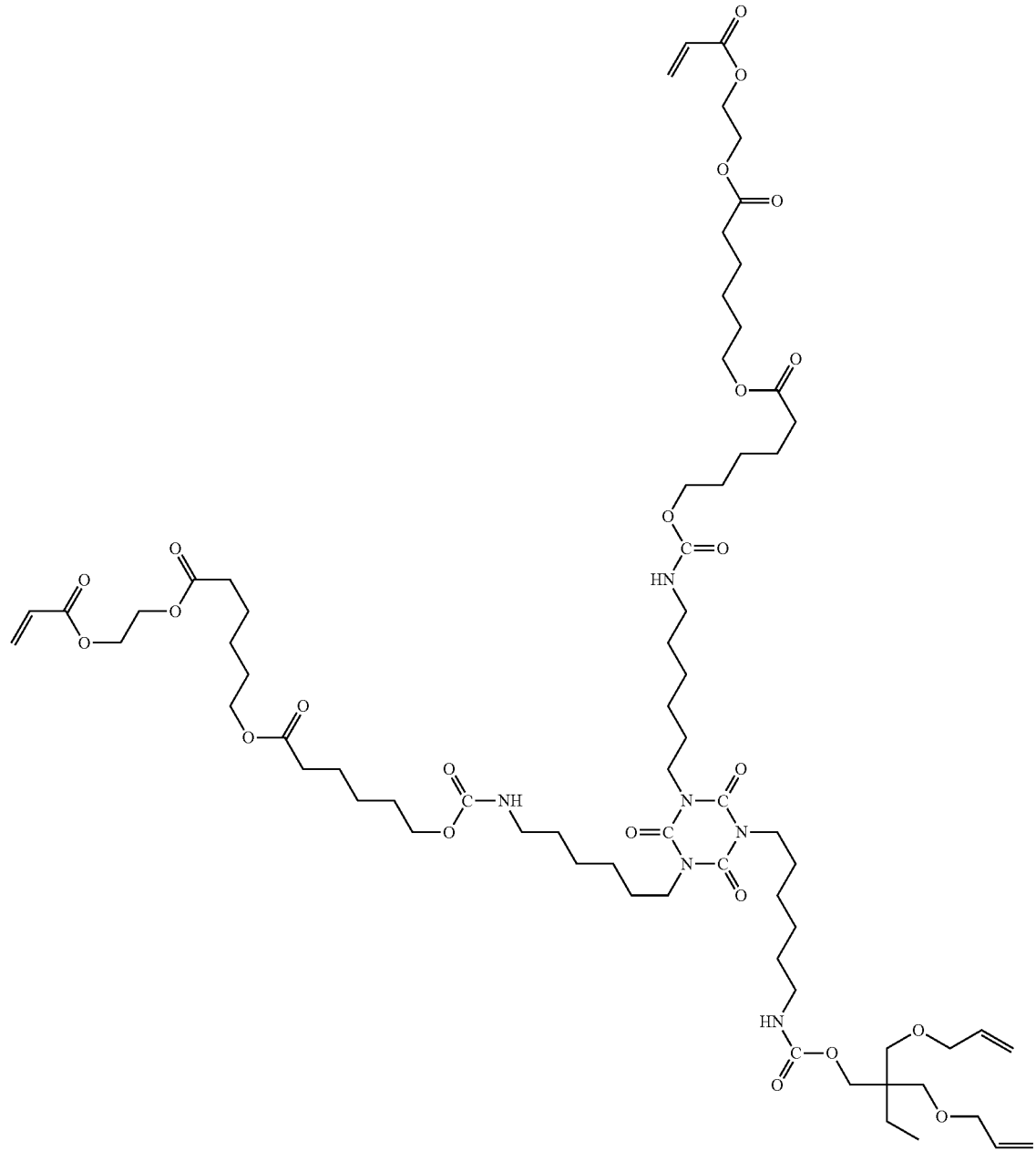

(003)
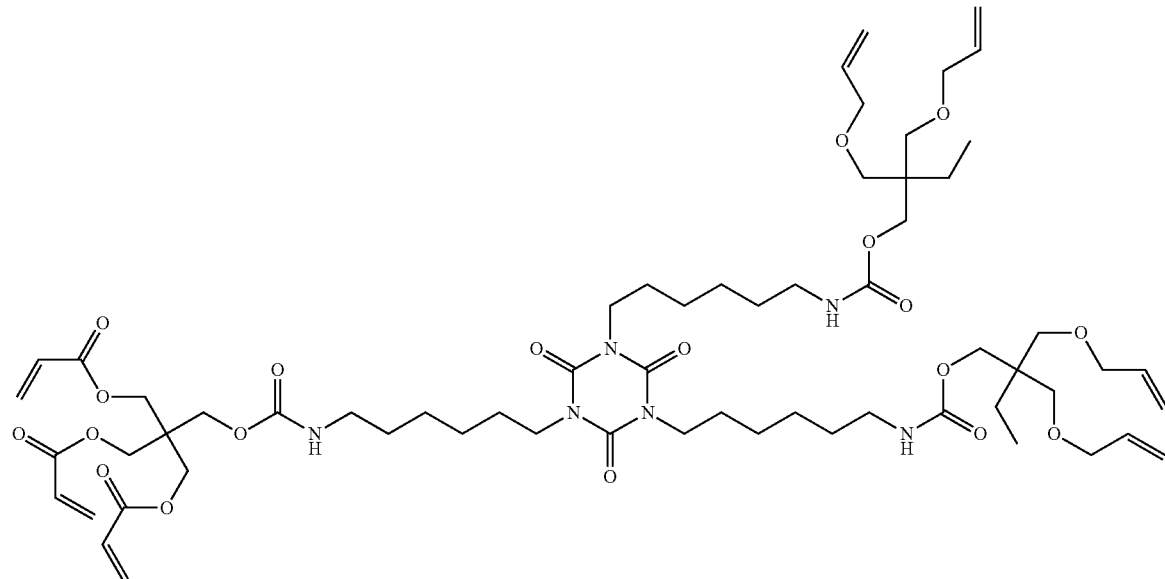
(004)
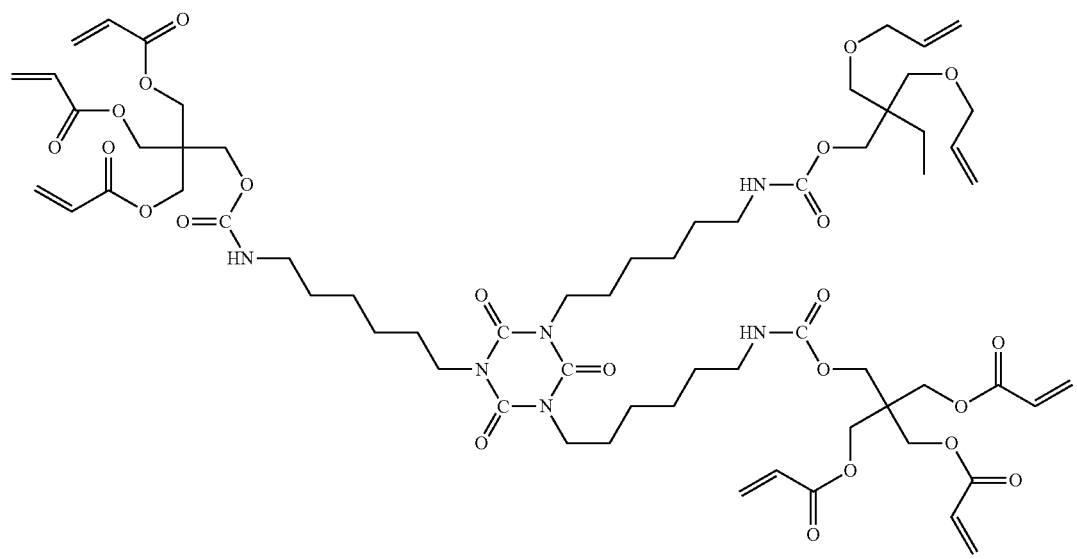
(005)
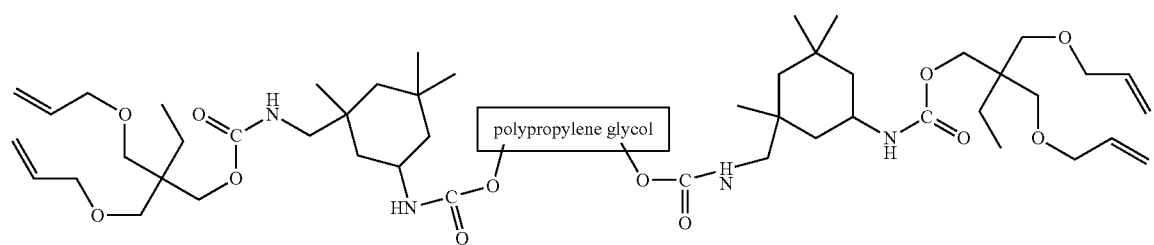
(006)
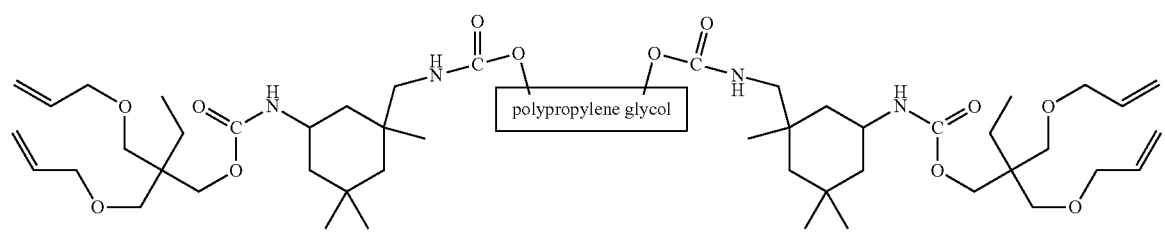

-continued (007)

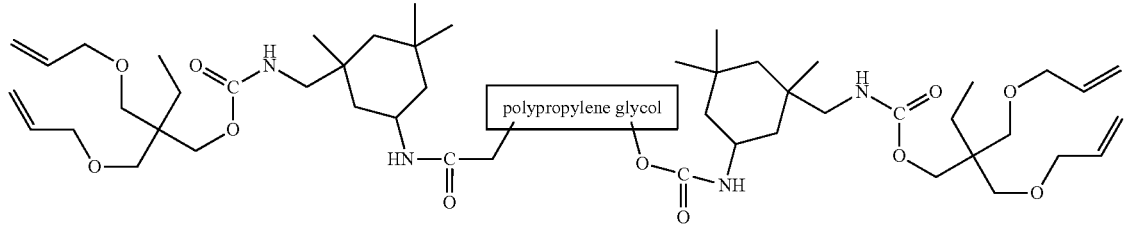

wherein the molecular weight Mn of polypropylene glycol in formula 005 to 007 is from 200 to 4000 preferably from 500 to 2000. Mn can be calculated from the OH value given the functionality of 2. "Polypropylene glycol" as specified in the above formulae is the residue of polypropylene glycol by removing the two terminal OH groups.

Preparation Method

The invention also relates to a method for preparing the urethane oligomer defined as above according to the invention, which comprises the following steps:

1-i) reacting a polyisocyanate represented by formula (III)

$$R[NCO]_{n1+n2} \quad (III)$$

with a monoalcohol represented by formula (IV)

$$H\text{-}A\text{-}[(R_3)_y\text{---}O\text{---}COCR_2\text{=}CH_2]_{m'} \quad (IV)$$

1-ii) reacting the product of step 1-i) with a monoalcohol represented by formula (II)

$$HO\text{---}R_1[O\text{---}CH_2CH\text{=}CH_2]_m \quad (II)$$

wherein
the monoalcohol of formula (II) is used in an amount of $a_{(II)}$ moles;
the polyisocyanate of formula (III) is used in an amount of $a_{(III)}$ moles;
the monoalcohol of formula (IV) is used in an amount of $a_{(IV)}$ moles,
$a_{(II)}$, $a_{(III)}$ and $a_{(IV)}$ have the following relationships:

$$0.8 \le (n1+n2) \times a_{(III)}/a_{(IV)} \le 1.25;$$

$$0.8 \le (n1+n2) \times a_{(III)}/(a_{(II)}+a_{(IV)}) \le 1.25;$$

or 2-i) reacting a polyisocyanate represented by formula (III)

$$R[NCO]_{n1+n2} \quad (III)$$

with a monoalcohol represented by formula (II)

$$HO\text{---}R_1[O\text{---}CH_2CH\text{=}CH_2]_m \quad (II)$$

2-ii) reacting the product of step 2-i) with a diol represented by formula (V)

$$HO\text{---}R_B\text{---}OH \quad (V)$$

wherein
the monoalcohol of formula (II) is used in an amount of $a_{(II)}$ moles;
the polyisocyanate of formula (III) is used in an amount of $a_{(III)}$ moles;
the monoalcohol formula (V) is used in an amount of $a_{(V)}$ moles;
$a_{(II)}$, $a_{(III)}$, and $a_{(V)}$ have the following relationships:

$$0.8 \le (n1+n2-1) \times a_{(III)}/a_{(II)} \le 1.25;$$

$$0.8 \le [(n1+n2) \times a_{(III)} - a_{(II)}]/(2 \times a_{(V)}) \le 1.25.$$

wherein the compounds of formulae (II), (III), (IV) and (V) are defined as above.

The above reaction is carried out in the presence of a catalyst and/or an anti-oxidant.

In an embodiment of the present invention, the catalyst can be a tin catalyst, e.g. tin(II) 2-ethylhexanoate.

In an embodiment of the present invention, the anti-oxidant can be 2,6-di-tert-butyl-4-methylphenol (butylated hydroxytoluene, BHT), mixtures of sterically hindered phenols (see, e.g., U.S. Pat. Nos. 3,280,049, 4,007,230, and 3,494,880) or mixtures of sterically hindered phenols with specific diphenylamines (see, e.g., U.S. Pat. Nos. 4,070,304, 4,265,783, 4,275,173, and 4,021,385). For more information about the reaction condition, a reference can be made to SZYCHER'S HANDBOOK OF POLYURETHANES. Second Edition. Michael Szycher, Ph.D. CRC Press. Taylor & Francis Croup. Boca Raton. London New York (2013).

Another subject of the invention relates to a curable composition, which comprises at least one urethane oligomer defined as above according to the invention, wherein said composition is curable in the presence of air (otherwise called air-drying). The curable composition may be curable by either peroxide initiator system, by electron beam or by UV radiation and in last case it further comprises at least one photo-initiator.

In a preferable embodiment, said curable composition is curable by UV radiation.

The curable composition may further comprise a reactive diluent selected from mono-functional or multi-functional (meth)acrylate monomers.

More particularly said curable composition is a UV-curable composition selected from the group consisting of a coating, an adhesive, a sealant or a resin matrix composition.

Another subject of the invention relates to the use of said urethane oligomer of the invention, in curable compositions in the presence of air, for good surface properties by reducing oxygen inhibition in coatings, adhesives, sealants or in resin matrix (particularly for entrapping liquid crystal system).

More particularly said use is in curable urethane acrylate compositions or in curable thiol-ene compositions with in the last case the said composition further comprising a polythiol (bearing at least two thiol —SH groups).

Finally the invention covers also a finished product selected from the group consisting of a coating, an adhesive, a sealant or a resin matrix, which results from the cure of at least one urethane oligomer or from the cure of the curable composition defined as above according to the present invention.

The following examples are presented for illustrating the invention and its performances and they do not limit in any way the scope of the present invention.

EXPERIMENTAL PART

Synthesis Examples

Unless indicated to the contrary, all of the starting materials in the synthesis examples are commercially available; the room temperature refers to a temperature of 15-30° C., and all percentages are based on the weight percent.

In the synthesis examples, the used starting compounds SR444D and SR495B have the following structures and are commercially available from Sartomer.

| Abbreviation | Structure/Name |
|---|---|
| SR444D (Pentaerythritol triacrylate) | Pentaerythritol triacrylate |
| SR495B (polycaprolactone acrylate) | $OH\!-\!(CH_2)_5\!-\!\overset{O}{\overset{\|}{C}}\!-\!O\!-\!(CH_2)_5\!-\!\overset{O}{\overset{\|}{C}}\!-\!O\!-\!CH_2\!-\!CH_2\!-\!O\!-\!\overset{O}{\overset{\|}{C}}\!-\!\underset{H}{\overset{\|}{C}}\!=\!CH_2$<br>6-(2-(acryloyloxy)ethoxy)-6-oxohexyl 6-hydroxyhexanoate |

Preparation Example 1

Hexamethylene diisocyanate (HDI) trimer (246.8 g), 2,6-di-tert-butyl-4-methylphenol (1.3 g) and tin(II) 2-ethylhexaoate (0.65 g) were added to a 4-necked round bottom flask and mixed well at 30° C. SR444D (232.6 g) was added at a constant rate within 120 minutes under dry air to carry out the reaction. The reaction was an exothermal process. Within the first 30 minutes, the temperature was raised to 60° C., and then maintained at 60° C. for the rest of the addition time. After the completion of adding SR444D, the mixture was kept at 60° C. for 20 minutes, and then sampled for NCO %. After determination of NCO % which was in the theoretical range (6.71%-7.45%), trimethylolpropane diallyl ether (TMPDE) (168.7 g) was added dropwise, and the reaction temperature was allowed to rise to 90° C. during addition. After the completion of adding TMPDE, the mixture was kept at 90° C. for 2 hours, and then sampled for NCO % hourly until NCO % was smaller than 0.06%.

Preparation Example 2

Hexamethylene diisocyanate trimer (HDI) (92.7 g), 2,6-di-tert-butyl-4-methylphenol (0.6 g) and tin(II) 2-ethylhexaoate (0.3 g) were added to a 4-necked round bottom flask and mixed well at 30° C. SR495B (174.7 g) was added at a constant rate within 120 minutes under dry air to carry out the reaction. The reaction was an exothermal process. Within the first 30 minutes, the temperature was raised to 60° C., and then maintained at 60° C. for the rest of the addition time. After the completion of adding SR495B, the mixture was kept at 60° C. for 20 minutes, and then sampled for NCO %. After determination of NCO % which was in the theoretical range (2.26%-2.51%), trimethylolpropane diallyl ether (TMPDE) (28.5 g) was added dropwise, and the reaction temperature was allowed to rise to 90° C. during addition. After the completion of adding TMPDE, the mixture was kept at 90° C. for 2 hours, and then sampled for NCO % hourly until NCO % was smaller than 0.06%.

Preparation Example 3

Isophorone diisocyanate (IPDI) (113.74 g), 2,6-di-tert-butyl-4-methylphenol (0.95 g) and tin(II) 2-ethylhexaoate (0.45 g) were added to a 4-necked round bottom flask and mixed well at 30° C. Trimethylol propane diallyl ether (TMPDE) (100 g) was added at a constant rate within 90 minutes under dry air to carry out the reaction. The reaction was an exothermal process. Within the first 30 minutes, the temperature was raised to 55° C. and then maintained at 55° C. for the rest of the addition time. After the completion of adding TMPDE, the mixture was kept at 55° C. for 20 minutes, and then sampled for NCO %. After determination of NCO % which is in the theoretical range (9.6%-10.5%), polypropylene glycol (Mn:1000, 254 g) was added dropwise, and the reaction temperature was allowed to rise to 85° C. during addition. After the completion of adding polypropylene glycol, the mixture was kept at 85° C. for 2 hours, then sampled for NCO % hourly until NCO % was smaller than 0.06%.

Test Example

All percentages were used by weight unless indicated otherwise.

In the test examples, the following known compounds were used. All of these compounds were commercially available.

| | |
|---|---|
| Irgacure 184 | 1-Hydroxycyclohexyl phenyl ketone |
| CN964 | Aliphatic polyester based urethane diacrylate oligomer, commercially available from Sartomer. |
| CN9101 | Allylic functional aliphatic oligomer, commercially available from Sartomer. |
| EAC | Ethyl acetate |

-continued

| | |
|---|---|
| BAC | Butyl acetate |
| IPA | Isopropyl alcohol |

Several coating composition were prepared. The prepared coating compositions comprised an oligomer, a photo-initiator, and a mixed solvent. The photo-initiator was Irgacure 184, and the mixed solvent was a combination of WAC/BAC/IPA in a weight ratio of 65/20/15. The specific coating compositions were shown in the following tables.

| Test Examples | 1 | 2 | 3 | 4 | 5 | 6 | 7 | 8 |
|---|---|---|---|---|---|---|---|---|
| CN964 | | | | | 42.5 | 42.5 | 42.5 | 42.5 |
| CN9101 | | | | 47.5 | | | | 5 |
| Preparation Example 1 | 47.5 | | | | 5 | | | |
| Preparation Example 2 | | 47.5 | | | | 5 | | |
| Preparation Example 3 | | | 47.5 | | | | 5 | |
| Irgacure 184 | 2.5 | 2.5 | 2.5 | 2.5 | 2.5 | 2.5 | 2.5 | 2.5 |
| Mixed Solvent | 50 | 50 | 50 | 50 | 50 | 50 | 50 | 50 |
| Total | 100 | 100 | 100 | 100 | 100 | 100 | 100 | 100 |
| Technical Coating Data | | | | | | | | |
| Thickness(μm) | 3 | 3 | 3 | 3 | 3 | 3 | 3 | 3 |
| Minimum Cure energy (mj/cm$^2$) | 400 | 200 | 3000 | >3000 | 700 | 500 | 3000 | >3000 |

The prepared coating compositions were dispersed at 400 RPM (rounds per minute) for 5 minutes and filtered. The coating composition was printed onto a PET film with a OSG 8 #bar, wire bar in a wire bar print machine to control the wet layer at a certain thickness (about 5 μm) so that the dried layer obtained after evaporation at temperature at 60° C. after 5 minutes had a thickness of around 2-3 μm. The resulting thickness was measured by a thickness meter and shown in the above tables.

The coating-printed PET film was subjected to a UV curing (using the Fusion F300s DRS-10/12 UV machine, H lamp, UV dose 750 mj/cm$^2$, and UV intensity 1000 mw/cm$^2$). The UV curing was repeated until the surface of the coating layer was completely cured. The repeating times of curing was recorded to calculate the total energy consumption.

Results indicated that TMPDE based polyurethane acrylate oligomers are with superior surface drying property and fast curing as compared to control.

The invention claimed is:

1. A urethane oligomer according to option a) or b), wherein:
a) at least two backbone residues R issued from a polyisocyanate without the NCO groups, linked between them with a diol residue $R_B$ by two urethane bonds and each of said backbone residues R carrying or linked to at least two urethane segments each containing at least one terminal allyl group, wherein said diol residue $R_B$ is derived from a diol selected from the group consisting of alkane diols, cycloalkane diols, oligoether diols, oligoester diols, and oligourethane diols and $R_B$ as the diol residue is a moiety formed by removing two hydroxyl groups from a diol,
b) at least one backbone residue R issued from a polyisocyanate without the NCO groups, said backbone residue R carrying or linked to at least two urethane segments each linked to R by one urethane bond with:
at least one urethane segment containing at least one terminal allyl group, and
at least one urethane segment containing at least one terminal (meth)acrylate group.

2. The urethane oligomer according to claim 1, wherein the urethane oligomer is represented by one of the following two formulae I-a or I-b, formula I-a representing option a) and formula I-b representing option b),

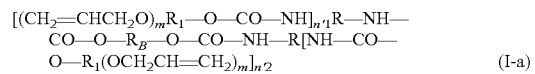

$$[(CH_2=CHCH_2O)_mR_1-O-CO-NH]_{n'1}R-NH-CO-O-R_B-O-CO-NH-R[NH-CO-O-R_1(OCH_2CH=CH_2)_m]_{n'2} \quad (I\text{-}a)$$

wherein
m>0, independently or dependently in each occurrence,
n'1>0, n'2>0, with n'=n'1+n'2 from 2 to 10,
each of m, n'1 and n'2 is an integer, and with n'1=n'2=n1+n2-1 with n1+n2=n being the functionality of said polyisocyanate and varying from 2 to 6, each of n1 and n2 is an integer with n1 and n2 being identical or different;
or

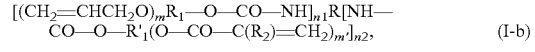

$$[(CH_2=CHCH_2O)_mR_1-O-CO-NH]_{n1}R[NH-CO-O-R'_1(O-CO-C(R_2)=CH_2)_{m'}]_{n2}, \quad (I\text{-}b)$$

wherein $R_2$ is H or $CH_3$;
n=n1+n22 and up to 6,
n1>0, n2>0, m>0, m'>0, m'=1 to 5, n>0, each of m, m', n, n1 and n2 is an integer with n1 and n2 being identical or different;
m is an integer of from 1 to 5;
m' is an integer from 1 to 5 which is identical to or different from m;
wherein
the backbone residue R is a moiety formed by removing all of NCO groups from a polyisocyanate;
$R_1$ is independently or dependently in each occurrence a (m+1)-valent group selected from $C_2$-$C_{12}$, aliphatic group or from an (m+1)-valent oligomeric group or a combination thereof;
$R'_1$ is a (m'+1)-valent group selected from $C_2$-$C_{12}$, aliphatic group or from an (m'+1)-valent oligomeric group or a combination thereof, wherein $R_1$ and $R'_1$ can be identical or different.

3. The urethane oligomer according to claim 2, wherein $R_1$ and $R'_1$ are independently an oligomeric segment selected from the group consisting of: an oligoester segment, an oligoether segment, an oligourethane segment and a combination thereof.

4. The urethane oligomer according to claim 2, wherein $R_1$ is:
an oligoester segment which is a moiety consisting of the repeating units —OR'—CO— or —OR'—COO—R"—CO—; wherein said R' and R" are different; or which is derived by removing H and OH from an oligoester H(O—R"—O—OC—R'—CO)$_{n"}$—OH based on a diacid HO$_2$C—R'—CO$_2$H and a diol HO—R"—OH, wherein n" is an integer of 2-10;

an oligoether segment which is a moiety consisting of the repeating units —O—R'— or —O—R'—O—R"—; or an oligourethane segment which is a moiety consisting of the repeating units —OR'O—OC—HN—R"—NH—CO—;

wherein said R' and R" are identical or different, and selected from an aliphatic group containing 2 to 12 carbon atoms, a cycloaliphatic group containing 5 to 10 carbon atoms, or an aromatic group containing 8 to 10 carbon atoms.

5. The urethane oligomer according to claim 3, wherein said oligoester segment is derived from one or more C$_4$-C$_6$ lactones.

6. The urethane oligomer according to claim 1, wherein
the urethane segment containing at least one terminal allyl group comprises 1 to 5 allyl groups, which are terminal groups of said urethane oligomer; and
the urethane segment containing at least one terminal (meth)acrylate group comprises 1 to 5 (meth)acrylate groups, which are terminal groups of said urethane oligomer.

7. The urethane oligomer according to claim 2, wherein
in the oligomer according to formula I-a
the at least one urethane arm containing at least one terminal allyl group contains from 1 to 3 allyl groups; and
in said formula I-b
the at least one urethane segment containing at least one terminal allyl group contains from 1 to 3 terminal allyl groups and the at least one urethane segment containing at least one terminal (meth)acrylate group contains from 1 to 3 terminal (meth)acrylate groups.

8. The urethane oligomer according to claim 1, wherein said urethane oligomer has an average in number molecular weight Mn measured by GPC in THF with polystyrene standards, from 500 to 5000 g/mol.

9. The urethane oligomer according to claim 1, which is obtainable from the reaction of
(1) at least one polyisocyanate R(NCO)n with n=n1+n2 having at least two isocyanate groups, both of n1 and n2 are an integer>0;
(2) at least one monoalcohol having at least one allyl group as terminal group; and
one or both of the following two:
(3-b) at least one monoalcohol having at least one (meth)acrylate group as terminal group and
(3-a) at least one diol bearing no ethylenic unsaturation and selected from the group consisting of alkane diols, cycloalkane diols, oligoether diols, oligoester diols, and oligourethane diols.

10. The urethane oligomer according to claim 1, wherein in the case of presence of both allyl and (meth)acrylate terminal groups the ratio (allyl)/(Meth)acrylate is from 0.1 to 10.

11. The urethane oligomer according to claim 1, wherein said urethane oligomer comprises at least two allyl groups.

12. The urethane oligomer according to claim 1, wherein it is represented by the following general formulae (I-1) or (I-2):

[(CH$_2$=CHCH$_2$O)$_m$R$_1$—O—CO—NH]$_{n1'}$R—NH—CO—O—R$_B$—O—CO—NH—R[NH—CO—O—R$_1$(OCH$_2$CH=CH$_2$)$_m$]$_{n2'}$     (I-1)

[(CH$_2$=CHCH$_2$O)$_m$R$_1$—O—CO—NH]$_{n1}$R[NH—CO-A-((R$_3$)$_y$—OCOCR$_2$=CH$_2$)$_{m'}$]$_{n2}$, wherein R$_2$ is H or CH$_3$;     (I-2)

wherein n1+n2=n is an integer from 2 to and both of n1 and n2 are an integer>0;

n1'=n1+n2-1=n2', with n1'+n2'=n' being an integer varying from 2 to 10;

m is an integer from 1 to 5;

m' is an integer from 1 to 5 and may be identical or different from m;

R is a residue derived by removing n=n1+n2 NCO groups from a polyisocyanate R(NCO)$_{(n1+n2)}$ or derived by removing all of NCO groups from an oligomer of the polyisocyanate R$_0$(NCO)$_{[(n1+n2)/n3]+1}$;

n3 is the oligomerization degree and can be an integer of 2, 3, 4, 5, 6;

R$_0$ is selected from an aliphatic, cycloaliphatic or aromatic [[(n1+n2)/n3]+1]-valent group, which can be substituted;

in case of being derived from the polyisocyanate R(NCO)$_{(n1+n2)}$, the group R is selected from an aliphatic, cycloaliphatic or aromatic n-valent group which can be substituted;

in case of being derived from an oligomer of the polyisocyanate R$_0$(NCO)$_{[(n1+n2)/n3]+1}$, the group R is an oligourethane n-valent segment;

R$_1$ is a (m+1)-valent group,

A is an (m+1)-valent oligomeric segment, selected from an oligoester segment resulting from an oligoester diol or from an oligolactone bearing terminal hydroxyl and carboxy terminal groups, by removing one OH and one H per each terminal group, an oligoether segment and an oligourethane segment respectively resulting by removing the two terminal groups of respectively oligoether diols or of oligourethane diols;

R$_3$ is oxyethylene or oxypropylene, and y is 0, 1 or 2; with the proviso that when A is an oligolactone segment then y=1 or 2, R$_2$ is —H or —CH$_3$.

13. The urethane oligomer according to claim 12, wherein it is the reaction product of a monoalcohol represented by formula (II), a polyisocyanate represented by formula (III), and one or both of a monoalcohol represented by formula (IV) and a diol represented by formula (V):

HO—R$_1$[O—CH$_2$CH=CH$_2$]$_m$     (II)

R[NCO]$_{n1+n2}$     (III)

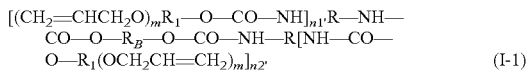

HO—R$_B$—OH     (V).

14. The urethane oligomer according to claim 1 wherein it the oligomer is selected from the group consisting of the following formulae:

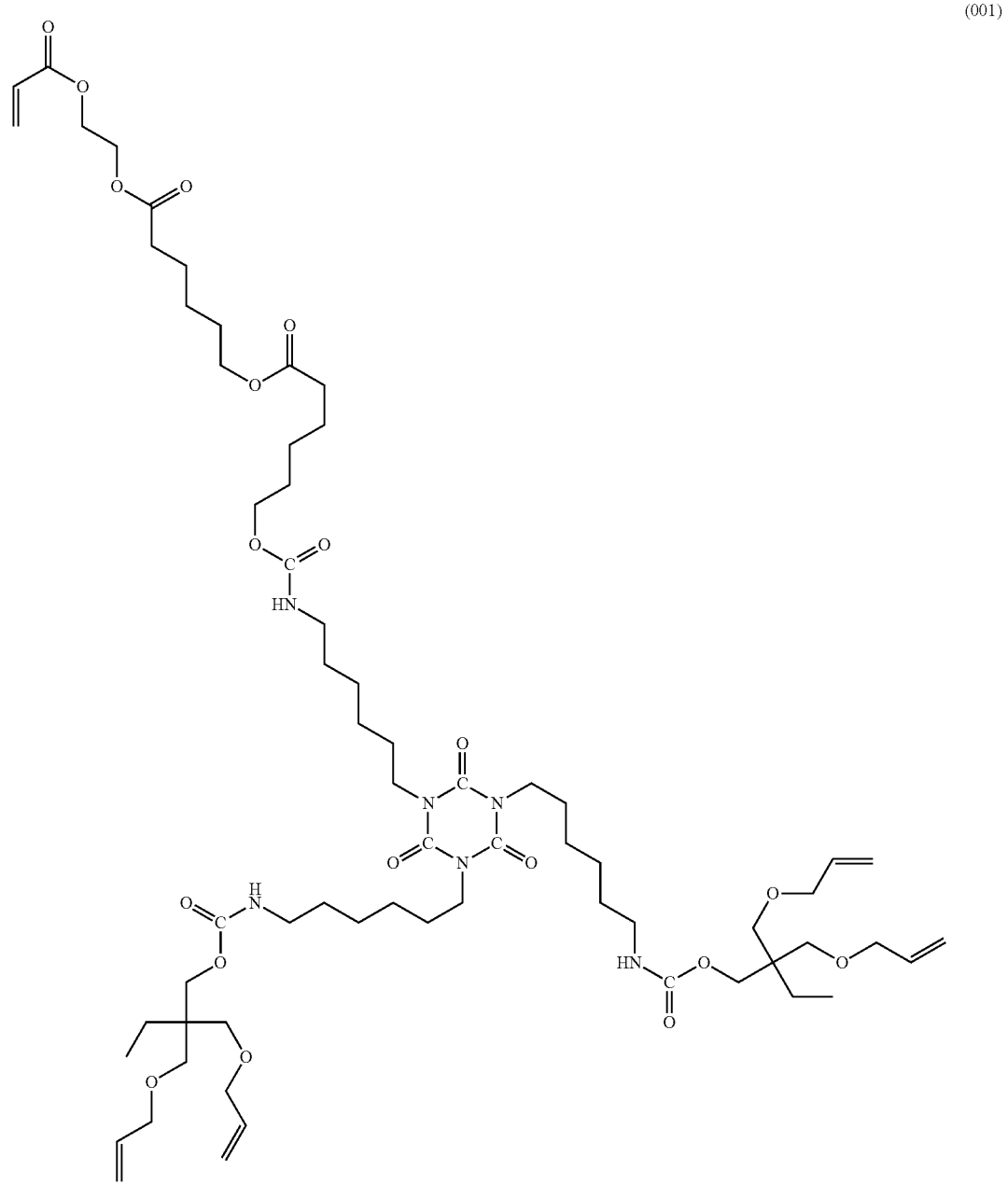 [SMILES: C=CCOCC(CC)(COCC=C)COC(=O)NCCCCCCn1c(=O)n(CCCCCCNC(=O)OCCCCCC(=O)OCCCCCC(=O)OCCOC(=O)C=C)c(=O)n(CCCCCCNC(=O)OCC(CC)(COCC=C)COCC=C)c1=O]
(001)

-continued
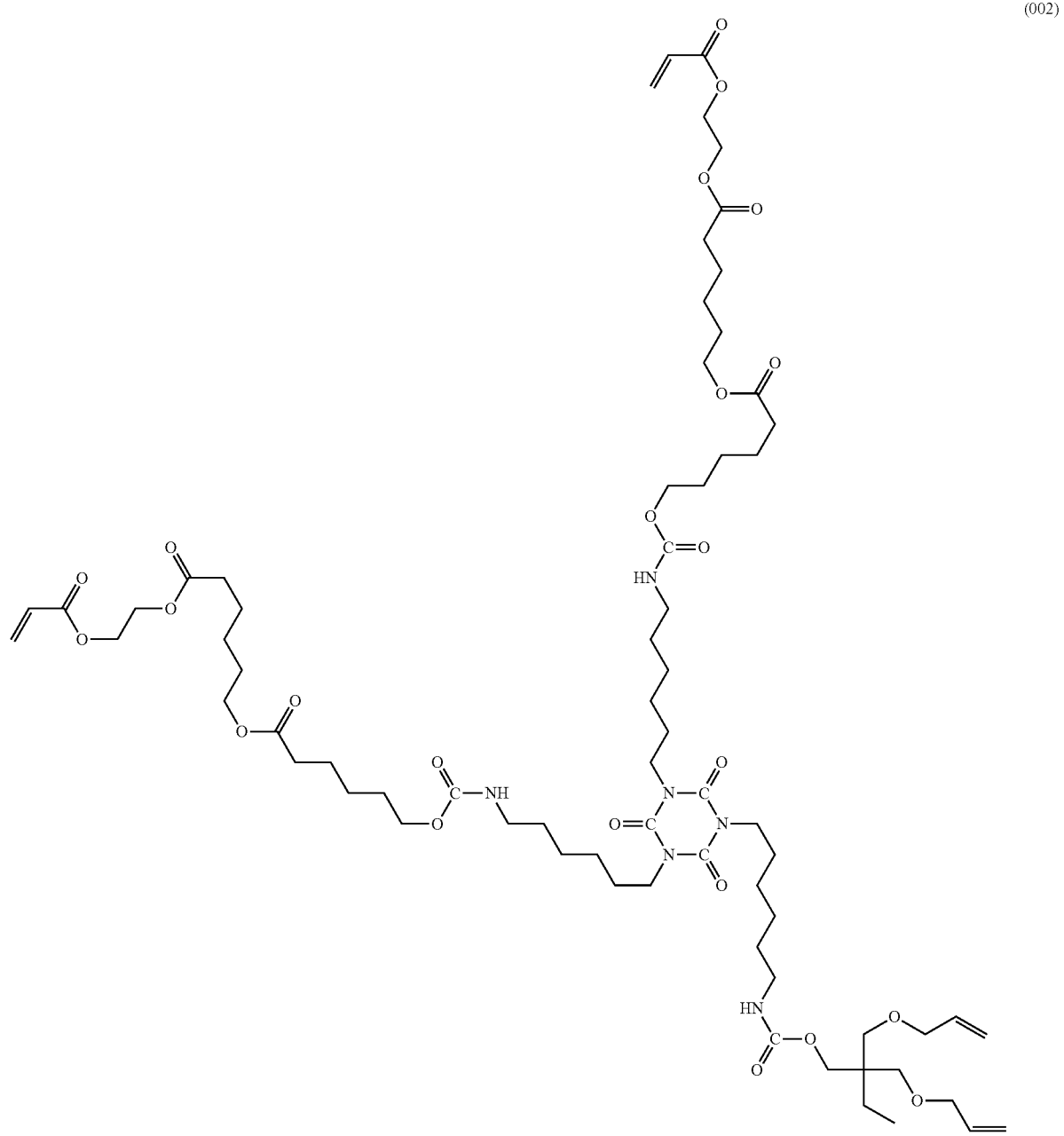 [SMILES: C=CCOCC(CC)(COCC=C)COC(=O)NCCCCCCn1c(=O)n(CCCCCCNC(=O)OCCCCCC(=O)OCCCCCC(=O)OCCOC(=O)C=C)c(=O)n(CCCCCCNC(=O)OCCCCCC(=O)OCCCCCC(=O)OCCOC(=O)C=C)c1=O]
(002)

-continued
(003)
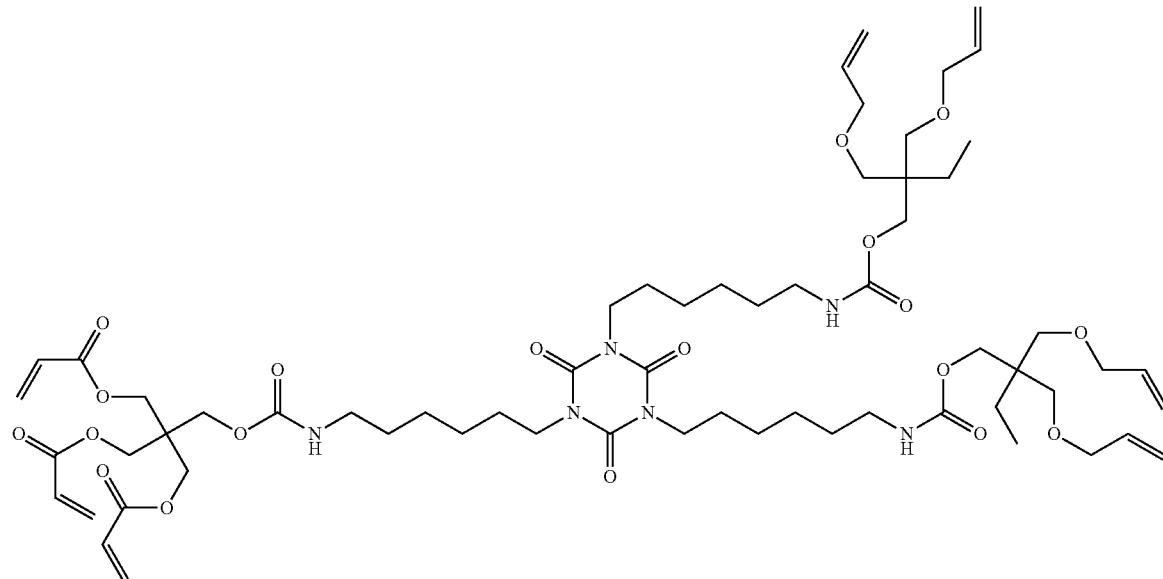
(004)
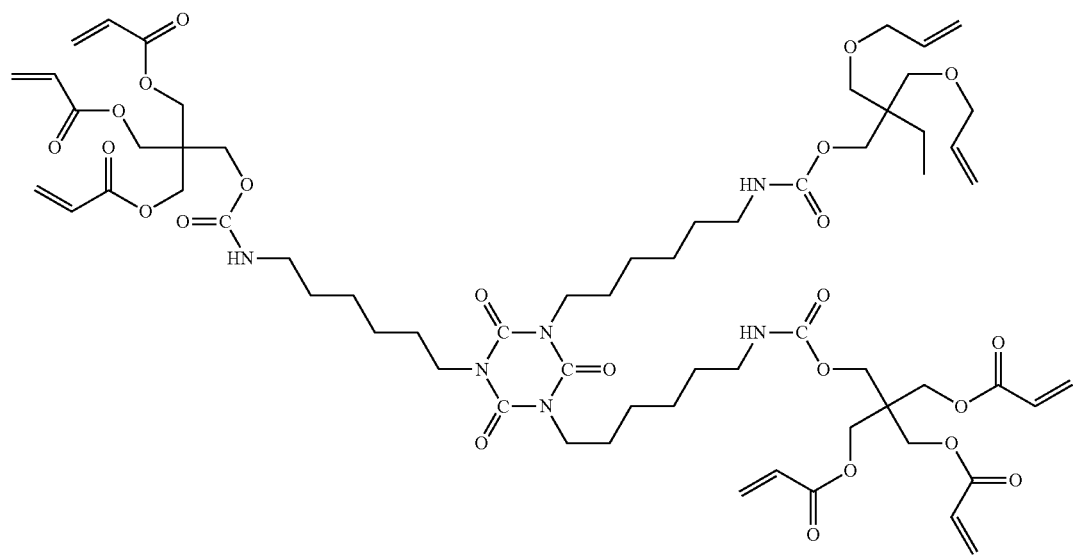
(005)
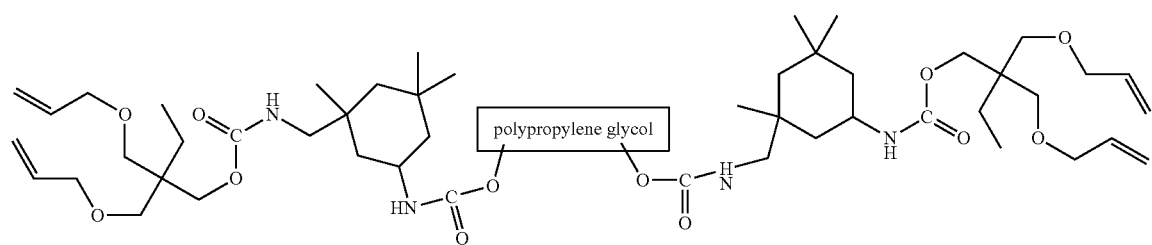
(006)
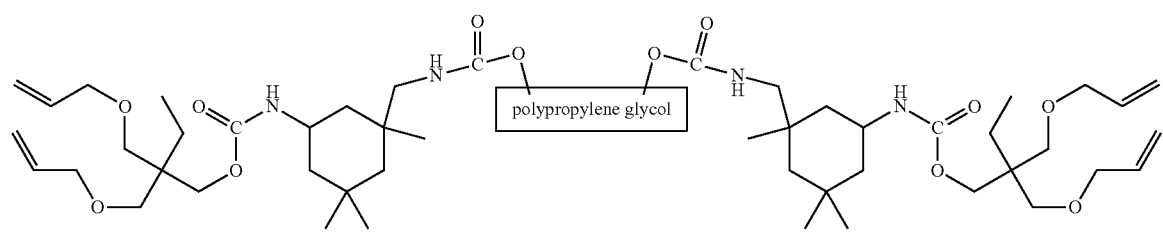

(007)

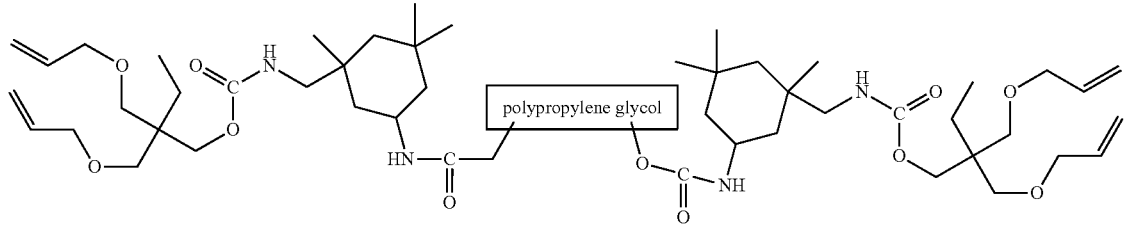

wherein the molecular weight Mn of polypropylene glycol in formulae 005, 006 and 007, is from 200 to 4000.

15. A method for preparing a urethane oligomer according to claim 1, which comprises the following steps:

1-i) reacting a polyisocyanate represented by formula (III)

$$R[NCO]_{n1+n2} \quad (III)$$

with a monoalcohol represented by formula (IV)

$$H\text{-}A\text{-}[(R_3)_y\text{—}O\text{—}COCR_2\text{=}CH_2]_{m'} \quad (IV)$$

1-ii) reacting the product of step 1-i) with a monoalcohol represented by formula (II)

$$HO\text{—}R_1[O\text{—}CH_2CH\text{=}CH_2]_m \quad (II)$$

wherein
the monoalcohol of formula (II) is used in an amount of $a_{(II)}$ moles;
the polyisocyanate of formula (III) is used in an amount of $a_{(III)}$ moles;
the monoalcohol of formula (IV) is used in an amount of $a_{(IV)}$ moles,
$a_{(II)}$, $a_{(III)}$ and $a_{(IV)}$ have the following relationships:

$$0.8 \leq (n1+n2) \times a_{(III)}/a_{(IV)} \leq 1.25;$$

$$0.8 \leq (n1+n2) \times a_{(III)}/(a_{(II)}+a_{(IV)}) \leq 1.25;$$

or 2-i) reacting a polyisocyanate represented by formula (III)

$$R[NCO]_{n1+n2} \quad (III)$$

with a monoalcohol represented by formula (II)

$$HO\text{—}R_1[O\text{—}CH_2CH\text{=}CH_2]_m \quad (II)$$

2-ii) reacting the product of step 2-i) with a diol represented by formula (V)

$$HO\text{—}R_B\text{—}OH \quad (V)$$

wherein
the monoalcohol of formula (II) is used in an amount of $a_{(II)}$ moles;
the polyisocyanate of formula (III) is used in an amount of $a_{(III)}$ moles;
the monoalcohol formula (V) is used in an amount of $a_{(V)}$ moles;
$a_{(II)}$, $a_{(III)}$, and $a_{(V)}$ have the following relationships:

$$0.8 \leq (n1+n2-1) \times a_{(III)}/a_{(II)} \leq 1.25;$$

$$0.8 \leq [(n1+n2) \times a_{(III)}-a_{(II)}]/(2 \times a_{(V)}) \leq 1.25;$$

wherein the compounds of formulae (II), (III), (IV) and (V) are defined as above.

16. The method according to claim 15, wherein the reaction is carried out in the presence of a catalyst and an anti-oxidant.

17. A curable composition comprising at least one urethane oligomer of claim 1 and said composition is curable in the presence of air.

18. The curable composition according to claim 17, wherein the curable composition is curable by a peroxide initiator system, by electron beam or by UV radiation.

19. The curable composition according to claim 17 further comprising a reactive diluent selected from mono-functional or multifunctional (meth)acrylate monomers.

20. The curable composition according to claim 17, wherein the curable composition is a UV-curable composition selected from the group consisting of a coating, an adhesive, a sealant or a resin matrix composition.

21. A method of using the urethane oligomer according to claim 1 comprising curing a curable composition comprising the urethane oligomer in the presence of air.

22. The method according to claim 21, wherein the curable composition is a curable urethane acrylate composition or a curable thiol-ene composition.

23. A cured composition selected from the group consisting of a coating, an adhesive, a sealant or a resin matrix, wherein it the cured composition results from the curing of the urethane oligomer according to claim 1.

* * * * *